United States Patent
Choi et al.

(10) Patent No.: US 9,924,179 B2
(45) Date of Patent: Mar. 20, 2018

(54) METHOD AND APPARATUS FOR CODING MULTILAYER VIDEO, METHOD AND APPARATUS FOR DECODING MULTILAYER VIDEO

(71) Applicant: SAMSUNG ELECTRONICS CO., LTD., Suwon-si (KR)

(72) Inventors: Byeong-doo Choi, Suwon-si (KR); Min-woo Park, Hwaseong-si (KR); Jae-won Yoon, Seoul (KR); Chan-yul Kim, Bucheon-si (KR); Jeong-hoon Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 210 days.

(21) Appl. No.: 14/760,265

(22) PCT Filed: Jan. 10, 2014

(86) PCT No.: PCT/KR2014/000334
§ 371 (c)(1),
(2) Date: Jul. 10, 2015

(87) PCT Pub. No.: WO2014/109607
PCT Pub. Date: Jul. 17, 2014

(65) Prior Publication Data
US 2015/0358629 A1 Dec. 10, 2015

Related U.S. Application Data

(60) Provisional application No. 61/751,032, filed on Jan. 10, 2013.

(51) Int. Cl.
*H04N 7/12* (2006.01)
*H04N 15/00* (2006.01)
(Continued)

(52) U.S. Cl.
CPC ......... *H04N 19/187* (2014.11); *H04N 19/107* (2014.11); *H04N 19/129* (2014.11);
(Continued)

(58) Field of Classification Search
CPC .. H04N 19/187; H04N 19/136; H04N 19/129; H04N 19/107; H04N 19/70; H04N 19/44; H04N 19/30
See application file for complete search history.

(56) References Cited

U.S. PATENT DOCUMENTS 8,295,625 B2 10/2012 Gao et al.
9,560,379 B2 1/2017 Song et al.
(Continued)

FOREIGN PATENT DOCUMENTS

CN 101238736 A 8/2008
CN 101513069 A 8/2009
(Continued)

OTHER PUBLICATIONS

Communication dated May 1, 2014 issued by the International Searching Authority in counterpart International Application No. PCT/KR2014/000334 (PCT/ISA/210/237).
(Continued)

*Primary Examiner* — Tsion B Owens
(74) *Attorney, Agent, or Firm* — Sughrue Mion, PLLC

(57) ABSTRACT

Provided are a method and apparatus for decoding a multi-layer video, and a method and apparatus for encoding a multi-layer video. The method includes obtaining a NAL unit including encoding information and type information of a first layer picture and identifying a type of the first layer picture, obtaining a NAL unit including encoding information and type information of a second layer picture and identifying a type of the second layer picture that is set to be the same as the type of the first layer picture having a same
(Continued)

POC as the second layer picture, and decoding the first layer picture and the second layer picture based on the identified first layer picture type and the identified second layer picture type.

9 Claims, 26 Drawing Sheets

(51) Int. Cl.
    *H04N 19/187*     (2014.01)
    *H04N 19/129*     (2014.01)
    *H04N 19/136*     (2014.01)
    *H04N 19/107*     (2014.01)
    *H04N 19/70*     (2014.01)
    *H04N 19/30*     (2014.01)
    *H04N 19/44*     (2014.01)

(52) U.S. Cl.
    CPC ............ *H04N 19/136* (2014.11); *H04N 19/30* (2014.11); *H04N 19/44* (2014.11); *H04N 19/70* (2014.11)

(56) References Cited

U.S. PATENT DOCUMENTS

| | | | |
|---|---|---|---|
| 9,674,524 B2* | 6/2017 | Deshpande | H04N 19/513 |
| 2006/0171471 A1* | 8/2006 | Zhou | H04N 7/52 |
| | | | 375/240.25 |
| 2010/0272185 A1 | 10/2010 | Gao et al. | |
| 2014/0218473 A1* | 8/2014 | Hannuksela | H04N 19/597 |
| | | | 348/43 |
| 2014/0219346 A1* | 8/2014 | Ugur | H04N 19/00575 |
| | | | 375/240.12 |
| 2014/0247883 A1* | 9/2014 | Lee | H04N 19/513 |
| | | | 375/240.16 |
| 2015/0043656 A1 | 2/2015 | Choi et al. | |
| 2015/0043657 A1 | 2/2015 | Choi et al. | |
| 2015/0222918 A1 | 8/2015 | Song et al. | |

FOREIGN PATENT DOCUMENTS

| | | |
|---|---|---|
| CN | 102845064 A | 12/2012 |
| EP | 2129129 A1 | 12/2009 |
| KR | 10-2011-0127175 A | 11/2011 |
| WO | 2010/100089 A1 | 9/2010 |
| WO | 2011/129573 A2 | 10/2011 |

OTHER PUBLICATIONS

Communication dated Jul. 14, 2015 issued by the International Searching Authority in International Application No. PCT/KR2014/000334 (PCT/IB/373).

Communication dated Nov. 16, 2017, from the State Intellectual Property Office of People's Republic of China in counterpart Application No. 201480013755.3.

* cited by examiner

FIG. 7
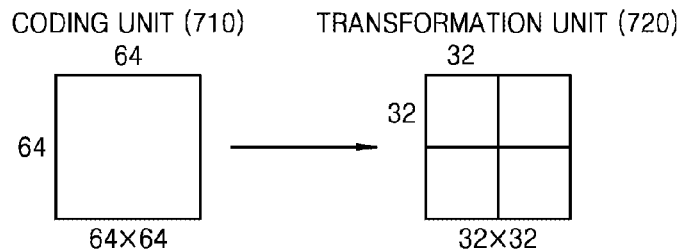
FIG. 8
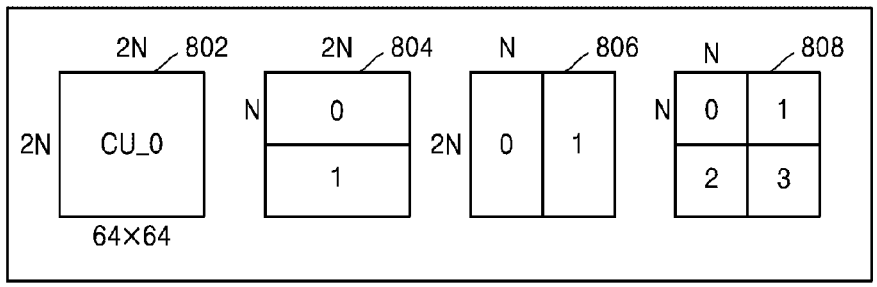
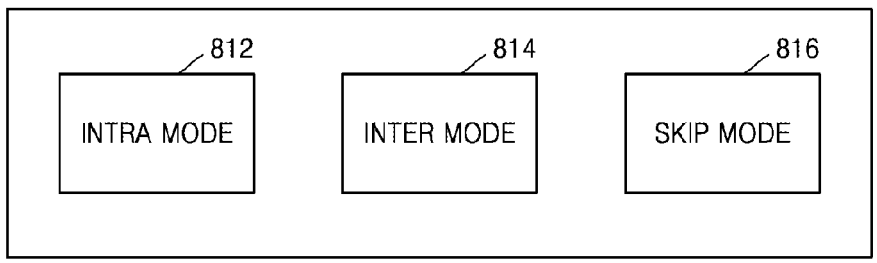
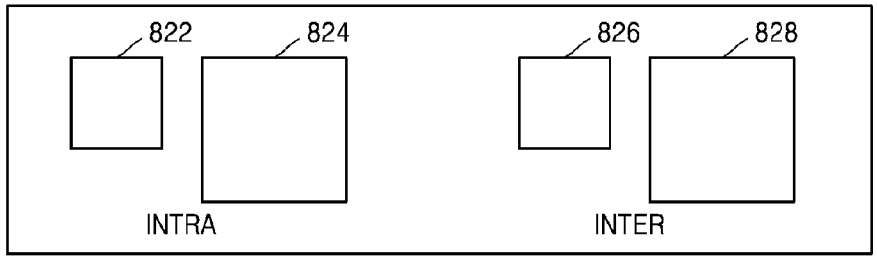

FIG. 21

| nal_unit_header( ) { | Descriptor |
|---|---|
| forbidden_zero_bit | f(1) |
| nal_unit_type | u(6) |
| reserved_zero_6bits | u(6) |
| temporal_id | u(3) |
| } | |

METHOD AND APPARATUS FOR CODING MULTILAYER VIDEO, METHOD AND APPARATUS FOR DECODING MULTILAYER VIDEO

CROSS-REFERENCE TO RELATED APPLICATIONS

This application is a National Stage application under 35 U.S.C. § 371 of PCT/KR2014/000334, filed on Jan. 10, 2014, which claims priority from U.S. Provisional Application 61/751,032, filed on Jan. 10, 2013 in the United States Patent and Trademark Office, all the disclosures of which are incorporated herein in their entireties by reference.

BACKGROUND

1. Field

Apparatuses and methods consistent with one or more exemplary embodiments relate to encoding and decoding of a video, and more particularly, to encoding and decoding pictures included in a plurality of layers.

2. Description of the Related Art

In general, image data is encoded by a codec according to a predetermined data compression standard, for example, the Moving Picture Experts Group (MPEG) standard, and then stored in an information storage medium as a bitstream or transmitted via a communication channel.

Scalable video coding (SVC), as a video compression method, appropriately adjusts and transmits an amount of information in accordance with various communication networks and terminals. A multi-view video coding compresses a multi-view video such as a three-dimensional image.

Such related art SVC or multi-view video coding encodes video by using a limited encoding method based on a macroblock of a predetermined size.

SUMMARY

Aspects of one or more exemplary embodiments provide a prediction structure for efficiently predicting a multi-layer video.

Aspects of one or more exemplary embodiments also provide a method of seamlessly reproducing a multi-layer video during a random access or layer-switching of the multi-layer video.

According to an aspect of an exemplary embodiment, there is provided a type of picture corresponding to respective layers of a multi-layer.

According to another aspect, there is provided a new type of picture operating as a random access point picture during layer switching.

According to aspects of one or more exemplary embodiments, seamless layer switching and random access are possible during reproduction of a multi-layer video.

According to an aspect of an exemplary embodiment, there is provided a multi-layer video decoding method including: obtaining a network adaptive layer (NAL) unit including encoding information and type information of a first layer picture; identifying, based on type information of the first layer picture included in the NAL unit, a type of the first layer picture from among: a first layer random access point (RAP) picture that is randomly accessible, a first layer random access decodable leading (RADL) picture among leading pictures that are encoded after the first layer RAP picture but precede the first layer RAP picture in an output order and are decodable to the first layer RAP picture during random access based on whether a picture decoded prior to the first layer RAP picture is referred to, and a first layer random access skipped leading (RASL) picture that is not decodable; obtaining a NAL unit including encoding information and type information of a second layer picture, and identifying, based on the type information of the second layer picture included in the NAL unit, a type of the second layer picture that is set to be the same as the type of the first layer picture having a same picture order count (POC) as the second layer picture; and decoding the first layer picture and the second layer picture based on the identified first layer picture type and the identified second layer picture type.

The first layer RAP picture may be one of an instantaneous decoding refresh (IDR) picture, a clean random access (CRA) picture, and a broken link access (BLA) picture that are classified based on whether pictures following the first layer RAP picture in a decoding order and an output order are able to refer to a picture preceding the first layer RAP picture in the decoding order and whether the first layer RAP picture is generated by splicing.

The IDR picture may be a picture for which pictures following the IDR picture in a decoding order do not refer to other pictures preceding the IDR picture in the decoding order, the CRA picture may be a picture for which pictures following the CRA picture in a decoding order and an output order do not refer to other pictures preceding the CRA picture in one of the decoding order and the output order, and a picture preceding the CRA picture may always precede the CRA picture in the output order, and the BLA picture may refer to a first picture of different video sequences that are combined by splicing.

The first layer RAP picture and the second layer RAP picture may be classified based on whether the RADL picture or the RASL picture exists.

The decoding may include, when random access to a second layer RAP picture is generated among pictures of the second layer, skipping a decoding process on pictures identified as leading pictures of the second layer RAP picture.

The identifying of the type of the second layer picture may include identifying, based on the type information included in the NAL unit, a second layer view layer access (VLA) picture that is a second layer RAP picture interlayer predicted by referring to other layers than the second layer; pictures following the second layer RAP picture in a decoding order and an output order may not refer to other pictures preceding the second layer RAP picture in one of the decoding order and the output order, and a picture preceding the second layer RAP picture in the decoding order may always precede the second layer RAP picture in the output order; and the decoding may include, when random access to the second layer VLA picture is generated, skipping decoding on a RADL picture and RASL pictures referring to a picture that is decoded prior to the second layer VLA picture and precedes the second layer VLA picture in an output order.

According to an aspect of another exemplary embodiment, there is provided a multi-layer video encoding method including: prediction encoding pictures included in a first layer; classifying pictures included in a first layer, based on an output order and a reference relationship of the pictures included in the first layer, into: a first layer random access point (RAP) picture that is randomly accessible, a first layer random access decodable leading (RADL) picture among leading pictures that are encoded after the first layer RAP picture but precede the first layer RAP picture in an output order and are reconstructable to the first layer RAP picture during random access based on whether a picture encoded prior to the first layer RAP picture is referred to, and a first layer random access skipped leading (RASL) picture that is not reconstructable; setting a type of a corresponding picture of a second layer having a same picture order count (POC) as each picture included in the first layer to be the same as the classified picture type of the first layer and prediction encoding pictures of the second layer; and outputting a NAL unit including encoding information and type information of the pictures of the first layer and the pictures of the second layer.

The classifying may include classifying the first layer RAP picture into an instantaneous decoding refresh (IDR) picture, a clean random access (CRA) picture, or a broken link access (BLA) picture based on whether pictures following the first layer RAP picture in an encoding order and an output order are able to refer to a picture preceding the first layer RAP picture in the encoding order and based on whether the first layer RAP picture is generated by splicing.

The IDR picture may be a picture for which pictures following the IDR picture in a decoding order do not refer to other pictures preceding the IDR picture in the decoding order, the CRA picture may be a picture for which pictures following the CRA picture in a decoding order and an output order do not refer to other pictures preceding the CRA picture in one of the decoding order and the output order, and a picture preceding the CRA picture always precedes the CRA picture in the output order, and the BLA picture may refer to a first picture of different video sequences that are combined by splicing.

The multi-layer encoding method may further include classifying the first layer RAP picture based on whether the RADL picture or the RASL picture exists.

The multi-layer encoding method may further include classifying, as a second layer view layer access (VLA) picture, a second layer RAP picture interlayer predicted by referring to other layers than the second layer, wherein pictures following the second layer RAP picture in an encoding order and an output order may not refer to other pictures preceding the second layer RAP picture in one of the encoding order and the output order, and a picture preceding the second layer RAP picture in the encoding order may always precede the second layer RAP picture in the output order, and wherein, when random access to the second layer VLA picture is generated in a decoder, decoding on a RADL picture and a RASL picture referring to a picture that is decoded prior to the second layer VLA picture and preceding the second layer VLA picture in an output order may be skipped.

According to an aspect of another exemplary embodiment, there is provided a multi-layer video decoding apparatus including: a receiver configured to obtain a network adaptive layer (NAL) unit including encoding information and type information of a first layer picture and a NAL unit including encoding information and type information of a second layer picture; and an image decoder configured to identify, based on type information of the first layer picture included in the NAL unit, a type of the first layer picture from among: a first layer random access point (RAP) picture that is randomly accessible, a first layer random access decodable leading (RADL) picture among leading pictures that are encoded after the first layer RAP picture but precede the first layer RAP picture in an output order and are decodable to the first layer RAP picture during random access based on whether a picture decoded prior to the first layer RAP picture is referred to, and a first layer random access skipped leading (RASL) picture that is not decodable, wherein the decoder is further configured to identify a type of the second layer picture that is set to be the same as a type of the first layer picture having a same POC as the second layer picture based on the type information of the second layer picture included in the NAL unit, and to decode the first layer picture and the second layer picture based on the identified first layer picture type and the identified second layer picture type.

The image decoder may be configured to identify, based on the type information included in the NAL unit, a second layer view layer access (VLA) picture that is a second layer RAP picture interlayer predicted by referring to other layers than the second layer; pictures following the second layer RAP picture in a decoding order and an output order may not refer to other pictures preceding the second layer RAP picture in one of the decoding order and the output order, and a picture preceding the second layer RAP picture in the decoding order may always precede the second layer RAP picture in the output order; and the image decoder may be further configured to, when random access to the second layer VLA picture is generated, skip decoding on a RADL picture and a RASL picture referring to a picture that is decoded prior to the second layer VLA picture and preceding the second layer VLA picture in an output order.

According to an aspect of another exemplary embodiment, there is provided a multi-layer video encoding apparatus including: a video encoder configured to prediction encode pictures included in a first layer and a second layer; and an output unit configured to classify pictures included in the first layer, based on an output order and a reference relationship of the pictures included in the first layer, into: a first layer random access point (RAP) picture that is randomly accessible, a first layer random access decodable leading (RADL) picture among leading pictures that are encoded after the first layer RAP picture but precede the first layer RAP picture in an output order and are reconstructable to the first layer RAP picture during random access based on whether a picture encoded prior to the first layer RAP picture is referred to, and a first layer random access skipped leading (RASL) picture that is not reconstructable, wherein the output unit is further configured to set a type of a corresponding picture of the second layer having a same POC as each picture included in the first layer to be the same as the classified picture type of the first layer, and output a NAL unit including encoding information and type information of the pictures of the first layer and pictures of the second layer.

The output unit may be configured to classify, as a second layer view layer access (VLA) picture, a second layer RAP picture interlayer predicted by referring to other layers than the second layer, from among pictures included in the second layer; pictures following the second layer RAP picture in an encoding order and an output order may not refer to other pictures preceding the second layer RAP picture in one of the encoding order and the output order, and a picture preceding the second layer RAP picture in the encoding order may always precede the second layer RAP picture in the output order; and when random access to the second layer VLA picture is generated, decoding on a RADL picture and a RASL picture referring to a picture that is decoded prior to the second layer VLA picture and preceding the second layer VLA picture in an output order may be skipped.

DESCRIPTION OF THE DRAWINGS

The above and other features and advantages will become more apparent by describing in detail exemplary embodiments with reference to the attached drawings in which:

FIG. 7 is a diagram for describing a relationship between a coding unit and transformation units, according to an exemplary embodiment;

FIG. 8 is a diagram for describing encoding information of coding units corresponding to a coded depth, according to an exemplary embodiment;

FIG. 21 illustrates an example of a header of a NAL unit according to an exemplary embodiment;

DETAILED DESCRIPTION OF EXEMPLARY EMBODIMENTS

Figure 1:
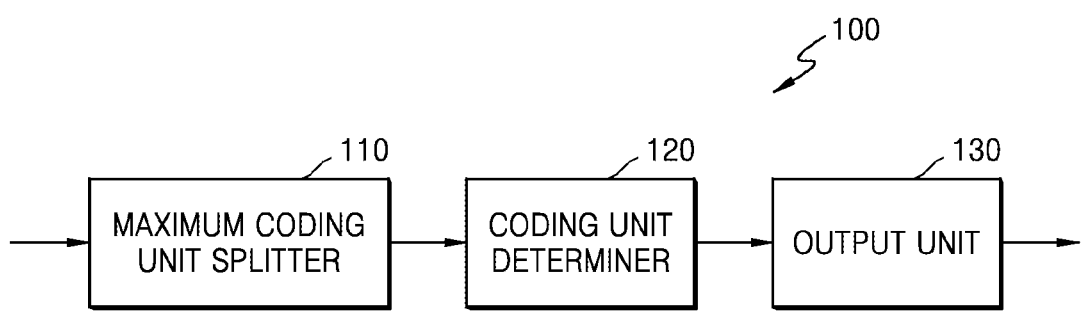
FIG. 1 is a block diagram of a video encoding apparatus based on coding units having a tree structure, according to an exemplary embodiment.

Exemplary embodiments will now be described more fully with reference to the accompanying drawings, in which like reference numerals refer to like elements throughout. As used herein, the term "and/or" includes any and all combinations of one or more associated items. Expressions such as "at least one of," when preceding a list of elements, modify the entire list of elements and do not modify the individual elements of the list.

FIG. 1 is a block diagram of a video encoding apparatus 100 according to an exemplary embodiment.

The video encoding apparatus 100 according to an exemplary embodiment includes a maximum coding unit splitter 110, a coding unit determiner 120, and an output unit 130 (e.g., outputter or output device).

The maximum coding unit splitter 110 may split a current picture based on a maximum coding unit that is a coding unit having a maximum size for the current picture of an image. If the current picture is larger than the maximum coding unit, image data of the current picture may be split into at least one maximum coding unit. The maximum coding unit according to an exemplary embodiment may be a data unit having a size of 32×32, 64×64, 128×128, or 256×256, wherein a shape of the data unit is a square having a width and length in squares of 2 that are greater than 8. The image data may be output to the coding unit determiner 120 according to the at least one maximum coding unit.

A coding unit according to an exemplary embodiment may be characterized by a maximum size and a depth. The depth denotes a number of times the coding unit is spatially split from the maximum coding unit, and as the depth increases, deeper coding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit increases, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit a total number of times that a height and a width of the maximum coding unit are hierarchically split, may be previously set.

The coding unit determiner 120 encodes at least one split region obtained by splitting a region of the maximum coding unit according to depths, and determines a depth to output final encoding results according to the at least one split region. In other words, the coding unit determiner 120 determines a coded depth by encoding the image data in the deeper coding units according to depths, according to the maximum coding unit of the current picture, and selecting a depth having a least encoding error. The determined coded depth and the image data according to the maximum coding unit are output to the output unit 130.

The image data in the maximum coding unit is encoded based on the deeper coding units corresponding to at least one depth equal to or less than the maximum depth, and encoding results are compared based on each of the deeper coding units. A depth having the least encoding error may be selected after comparing encoding errors of the deeper coding units. At least one coded depth may be selected for each maximum coding unit.

A size of the maximum coding unit is split as a coding unit is hierarchically split according to depths, and a number of coding units increases. Also, even if coding units correspond to the same depth in one maximum coding unit, it is determined whether to split each of the coding units corresponding to the same depth to a lower depth by measuring an encoding error of the data of each coding unit, separately. Accordingly, even when data is included in one maximum coding unit, the encoding errors according to depths may differ according to regions, and thus the coded depths may differ according to regions. Thus, one or more coded depths may be set for one maximum coding unit, and the data of the maximum coding unit may be divided according to coding units of the one or more coded depths.

Accordingly, the coding unit determiner 120 according to an exemplary embodiment may determine coding units having a tree structure included in a current maximum coding unit. The 'coding units having a tree structure' according to an exemplary embodiment include coding units corresponding to a depth determined to be a coded depth, from among all coding units corresponding to depths included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to a number of times splitting is performed from a maximum coding unit to a minimum coding unit. A first maximum depth according to an exemplary embodiment may denote a total number of times splitting is performed from the maximum coding unit to the minimum coding unit. A second maximum depth according to an exemplary embodiment may denote a total number of depth levels from the maximum coding unit to the minimum coding unit. For example, when a depth of the maximum coding unit is 0, a depth of a coding unit in which the maximum coding unit is split once may be set to 1, and a depth of a coding unit in which the maximum coding unit is split twice may be set to 2. In this case, if the minimum coding unit is a coding unit obtained by splitting the maximum coding unit four times, 5 depth levels of depths 0, 1, 2, 3 and 4 exist, and thus the first maximum depth may be set to 4 and the second maximum depth may be set to 5.

Prediction encoding and frequency transformation may be performed according to the maximum coding unit. The prediction encoding and the transformation are also performed based on the deeper coding units according to a depth equal to or depths less than the maximum depth, according to the maximum coding unit.

Since a number of deeper coding units increases whenever the maximum coding unit is split according to depths, encoding including the prediction encoding and the frequency transformation are performed on all of the deeper coding units generated as the depth increases. For convenience of description, the prediction encoding and the frequency transformation will now be described based on a coding unit of a current depth, from among at least one maximum coding unit.

The video encoding apparatus 100 according to an exemplary embodiment may variously select a size or shape of a data unit for encoding the image data. In order to encode the image data, operations, such as prediction encoding, frequency transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, i.e., based on a coding unit that is no longer split into coding units corresponding to a lower depth. Hereinafter, the coding unit that is no longer split and becomes a basis unit for prediction encoding will now be referred to as a 'prediction unit'. A partition obtained by splitting the prediction unit may include a prediction unit and a data unit obtained by splitting at least one of a height and a width of the prediction unit.

For example, when a coding unit of 2N×2N (where N is a positive integer) is no longer split, the coding unit may become a prediction unit of 2N×2N and a size of a partition may be 2N×2N, 2N×N, N×2N, or N×N. Examples of a partition type include symmetrical partitions that are obtained by symmetrically splitting a height or a width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, an inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 according to an exemplary embodiment may also perform the transformation on the image data in a coding unit based not only on the coding unit for encoding the image data but also based on a data unit that is different from the coding unit.

In order to perform frequency transformation in the coding unit, the frequency transformation may be performed based on a data unit having a size smaller than or equal to the coding unit. For example, the data unit for frequency transformation may include a data unit for an intra mode and a data unit for an inter mode.

Hereinafter, a data unit which is the basis for frequency transformation may be referred to as a 'transformation unit.' Similarly to the coding unit, the transformation unit in the coding unit may be recursively split into smaller sized transformation units, and thus, residual data in the coding unit may be divided according to the transformation unit having a tree structure according to transformation depths.

A transformation depth indicating a number of times splitting is performed to reach the transformation unit by splitting the height and width of the coding unit may also be set in the transformation unit according to an exemplary embodiment. For example, in a current coding unit of 2N×2N, a transformation depth may be 0 when the size of a transformation unit is 2N×2N, may be 1 when the size of a transformation unit is N×N, and may be 2 when the size of a transformation unit is N/2×N/2. That is, the transformation unit having the tree structure may also be set according to transformation depths.

Encoding information according to coding units corresponding to a coded depth includes not only information about the coded depth but also about information related to prediction and transformation. Accordingly, the coding unit determiner 120 not only determines a coded depth having a least encoding error but also determines a partition type in a prediction unit, a prediction mode according to prediction units, and a size of a transformation unit for transformation.

Coding units having a tree structure in a maximum coding unit and a method of determining a coding unit and a partition according to an exemplary embodiment will be described in detail below with reference to FIGS. 3 through 12.

The coding unit determiner 120 may measure an encoding error of deeper coding units according to depths by using Rate-Distortion (RD) Optimization based on Lagrangian multiplier.

The output unit 130 outputs the image data of the maximum coding unit, which is encoded based on the at least one coded depth determined by the coding unit determiner 120, and information about the encoding mode according to the coded depth, in a bitstream.

The encoded image data may be obtained by encoding residual data of an image.

The information about the encoding mode according to coded depth may include information about the coded depth, the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, the encoding is performed on the current coding unit of the current depth, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit and information about at least one encoding mode is determined for a coding unit of a coded depth, information about at least one encoding mode may be determined for one maximum coding unit. Also, a coded depth of the data of the maximum coding unit may be different according to locations since the data is hierarchically split according to depths, and thus information about the coded depth and the encoding mode may be set for the data.

Accordingly, the output unit 130 according to an exemplary embodiment may assign encoding information about a corresponding coded depth and an encoding mode to at least one of the coding unit, the prediction unit, and a minimum unit included in the maximum coding unit.

The minimum unit according to an exemplary embodiment is a rectangular data unit obtained by splitting the minimum coding unit constituting a lowermost depth by 4. Alternatively, the minimum unit may be a maximum rectangular data unit that may be included in all of the coding units, prediction units, partition units, and transformation units included in the maximum coding unit.

For example, the encoding information output through the output unit 130 may be classified into encoding information according to deeper coding units according to depths, and encoding information according to prediction units. The encoding information according to the deeper coding units according to depths may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode. Also, information about a maximum size of a coding unit defined for each picture, slice or group of pictures (GOP) and information about a maximum depth may be inserted into a header of a bitstream.

Also, information about a maximum size of the coding unit defined according to pictures, slices, or GOPs, and information about a maximum depth may be inserted into a header of a bitstream, a sequence parameter set, or a picture parameter set, etc.

Information about a maximum size of the transformation unit allowed for a current video and information about a minimum size of the transformation unit may be output through the header of the bitstream, the sequence parameter set, or the picture parameter set, etc.

In the video encoding apparatus 100 according to an exemplary embodiment, the deeper coding unit is a coding unit obtained by dividing a height or a width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include a maximum number of 4 coding units of the lower depth.

Accordingly, the video encoding apparatus 100 according to an exemplary embodiment may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering image characteristics of the coding unit of various image sizes.

Thus, if an image having high resolution or a large data amount is encoded in a related art macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100 according to an exemplary embodiment, image compression efficiency may be increased since a coding unit is adjusted while considering characteristics of an image while increasing a maximum size of a coding unit while considering a size of the image.

Figure 2:
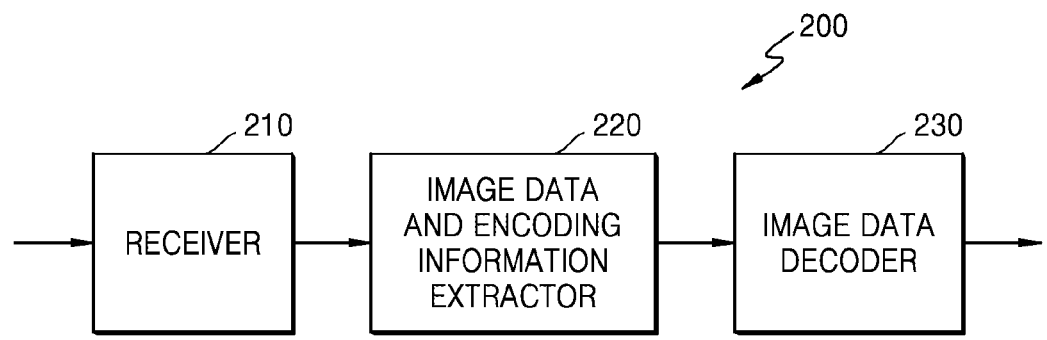
FIG. 2 is a block diagram of a video decoding apparatus based on coding units having a tree structure, according to an exemplary embodiment.

FIG. 2 is a block diagram of a video decoding apparatus 200 based on coding units having a tree structure, according to an exemplary embodiment.

The video decoding apparatus 200 according to an exemplary embodiment includes a receiver 210, an image data and encoding information extractor 220, and an image data decoder 230. Hereinafter, definitions of terms such as a coding unit for various processing, a depth, a prediction unit, a transformation unit, information about various encoding modes are the same as or similar to those described above with reference to FIG. 1 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header about the current picture.

Also, the image data and encoding information extractor 220 extracts information about a coded depth and an encoding mode for the coding units having the tree structure according to each maximum coding unit, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coded depth, and information about an encoding mode according to each coded depth may include information about a partition type of a corresponding coding unit, a prediction mode, and a size of a transformation unit. Also, split information according to depths may be extracted as the information about the coded depth.

The information about the coded depth and the encoding mode according to each maximum coding unit extracted by the image data and encoding information extractor 220 is information about a coded depth and an encoding mode determined to generate a least encoding error when an encoder, such as the video encoding apparatus 100, repeatedly performs encoding for each deeper coding unit according to depths according to each maximum coding unit. Accordingly, the video decoding apparatus 200 may reconstruct an image by decoding the data according to an encoding mode that generates the least encoding error.

Since encoding information about the coded depth and the encoding mode according to an exemplary embodiment may be assigned to a predetermined data unit from among a corresponding coding unit, a prediction unit, and a minimum unit, the image data and encoding information extractor 220 may extract the information about the coded depth and the encoding mode according to the predetermined data units. When the information about the coded depth of the corresponding maximum coding unit and the encoding mode is recorded according to the predetermined data units, the predetermined data units having the same information about the coded depth and the encoding mode may be inferred to be the data units included in the same maximum coding unit.

The image data decoder 230 reconstructs the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include prediction including intra prediction and motion compensation, and inverse transformation.

The image data decoder 230 may perform intra prediction or motion compensation according to a partition and a prediction mode of each coding unit, based on the information about the partition type and the prediction mode of the prediction unit of the coding unit according to coded depths.

Also, the image data decoder 230 may perform inverse frequency transformation based on each transformation unit in the coding unit so as to perform the inverse frequency transformation according to maximum coding units.

The image data decoder 230 may determine a coded depth of a current maximum coding unit by using split information according to depths. If the split information indicates that image data is no longer split in the current depth, the current depth is a coded depth. Accordingly, the image data decoder 230 may decode encoded data of the current depth by using the information about the partition type of the prediction unit, the prediction mode, and the size of the transformation unit for image data of the current maximum coding unit.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode.

The video decoding apparatus 200 according to an exemplary embodiment may obtain information about a coding unit that generates the least encoding error when encoding is recursively performed for each maximum coding unit, and may use the information to decode the current picture. In other words, encoded image data of the coding units having the tree structure determined to be the optimum coding units in each maximum coding unit may be decoded.

Accordingly, even if image data has high resolution and a large amount of data, the image data may be efficiently decoded and reconstructed according to a size of a coding unit and an encoding mode, which are adaptively determined according to characteristics of an image, by using information about an optimum encoding mode received from an encoder.

Hereinafter, a method of determining coding units having a tree structure, prediction units, and transformation units according to an exemplary embodiment will be described with reference to FIGS. 3 through 13.

Figure 3:
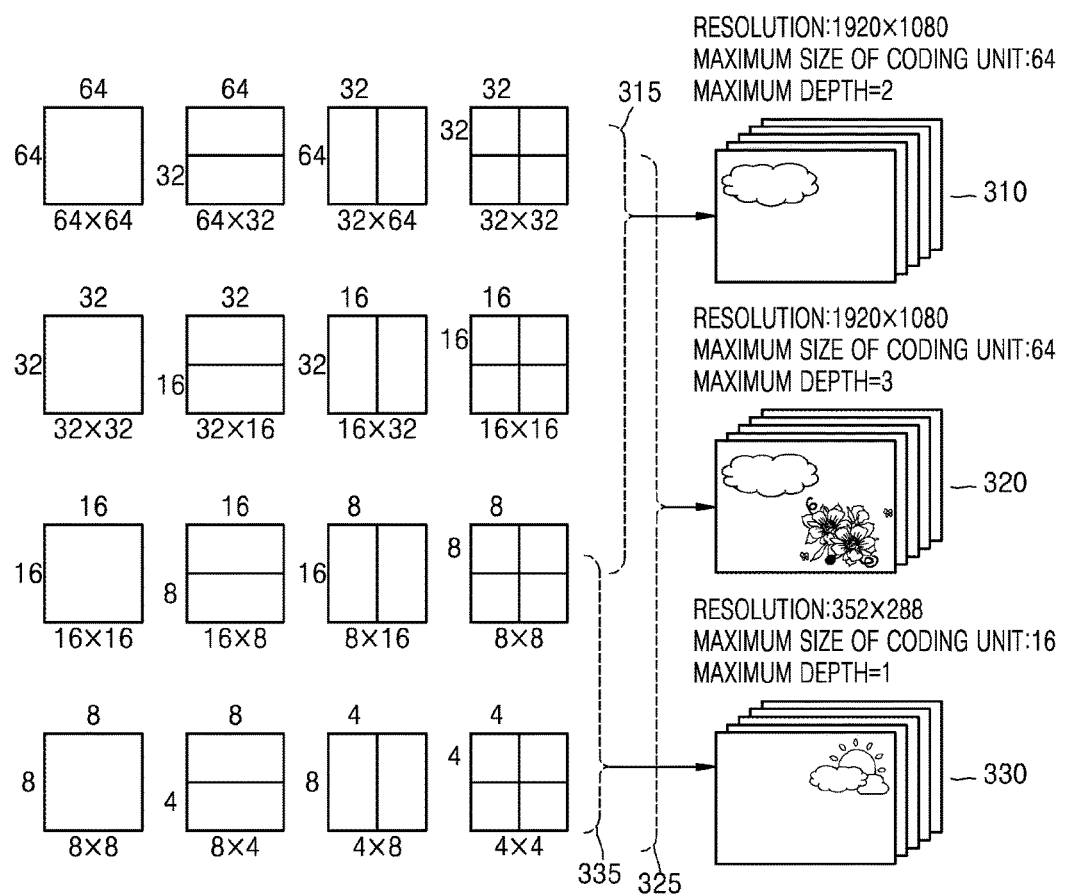
FIG. 3 is a diagram for describing a concept of coding units according to an exemplary embodiment.

FIG. 3 is a diagram for describing a concept of hierarchical coding units.

A size of a coding unit may be expressed in width×height, and examples of the size of the coding unit may include 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is set to 1920×1080, a maximum size of a coding unit is set to 64, and a maximum depth is set to 2. In video data 320, a resolution is set to 1920×1080, a maximum size of a coding unit is set to 64, and a maximum depth is set to 3. In video data 330, a resolution is set to 352×288, a maximum size of a coding unit is set to 16, and a maximum depth is set to 1. The maximum depth shown in FIG. 3 denotes a total number of splits from a maximum coding unit to a minimum decoding unit.

If a resolution is high or a data amount is large, a maximum size of a coding unit may be large so as to not only increase encoding efficiency, but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the video data 310 may include a maximum coding unit having a long axis size of 64, and coding units having long axis sizes of 32 and 16 since depths are increased to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are increased to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are increased to 3 layers by splitting the maximum coding unit three times. As a depth increases, detailed information may be more precisely expressed.

Figure 4:
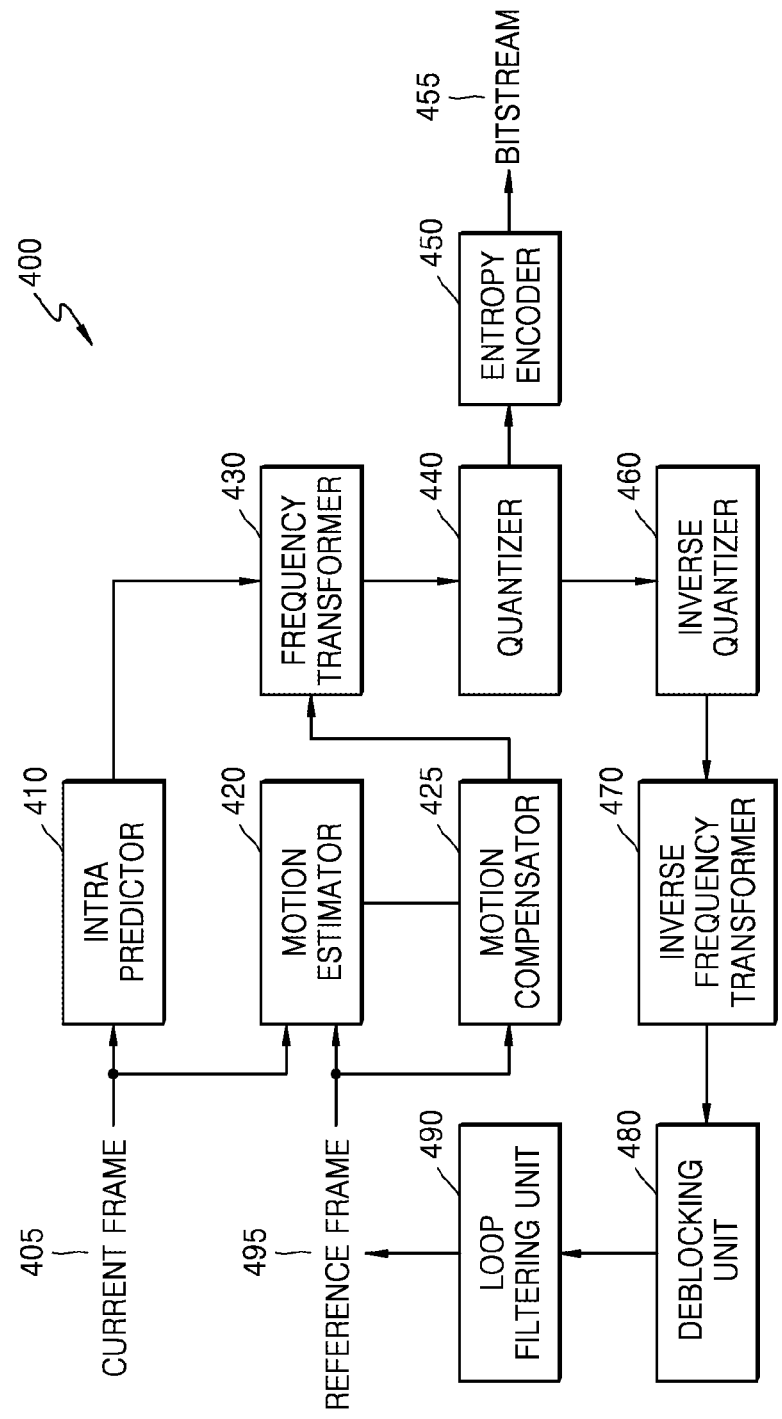
FIG. 4 is a block diagram of an image encoder based on coding units, according to an exemplary embodiment.

FIG. 4 is a block diagram of an image encoder 400 based on coding units, according to an exemplary embodiment.

The image encoder 400 according to an exemplary embodiment performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 perform inter estimation and motion compensation on coding units in an inter mode from among the current frame 405 by using the current frame 405 and a reference frame 495.

Data output from the intra predictor 410, the motion estimator 420, and the motion compensator 425 is output as a quantized transformation coefficient through a frequency transformer 430 and a quantizer 440. Specifically, when performing bilateral motion prediction and compensation, the motion estimator 420 and the motion compensator 425 according to an exemplary embodiment perform bilateral motion compensation in pixel units in addition to a result obtained by performing bilateral motion prediction and compensation based on blocks. This will be described in detail with reference to FIG. 14 below.

The quantized transformation coefficient is reconstructed to data in a spatial domain through an inverse quantizer 460 and an inverse frequency transformer 470, and the reconstructed data in the spatial domain is output as the reference frame 495 after being post-processed through a deblocking unit 480 (e.g., deblocker) and a loop filtering unit 490 (e.g., loop filter or loop filterer). The quantized transformation coefficient may be output as a bitstream 455 through an entropy encoder 450.

In order for the image encoder 400 to be applied in the video encoding apparatus 100 according to an exemplary embodiment, all elements of the image encoder 400, i.e., the intra predictor 410, the motion estimator 420, the motion compensator 425, the frequency transformer 430, the quantizer 440, the entropy encoder 450, the inverse quantizer 460, the inverse frequency transformer 470, the deblocking unit 480, and the loop filtering unit 490 perform operations based on each coding unit from among coding units having a tree structure while considering the maximum depth of each maximum coding unit.

Specifically, the intra predictor 410, the motion estimator 420, and the motion compensator 425 determine partitions and a prediction mode of each coding unit from among the coding units having the tree structure while considering the maximum size and the maximum depth of a current maximum coding unit, and the frequency transformer 430 determines the size of the transformation unit in each coding unit from among the coding units having the tree structure.

Figure 5:
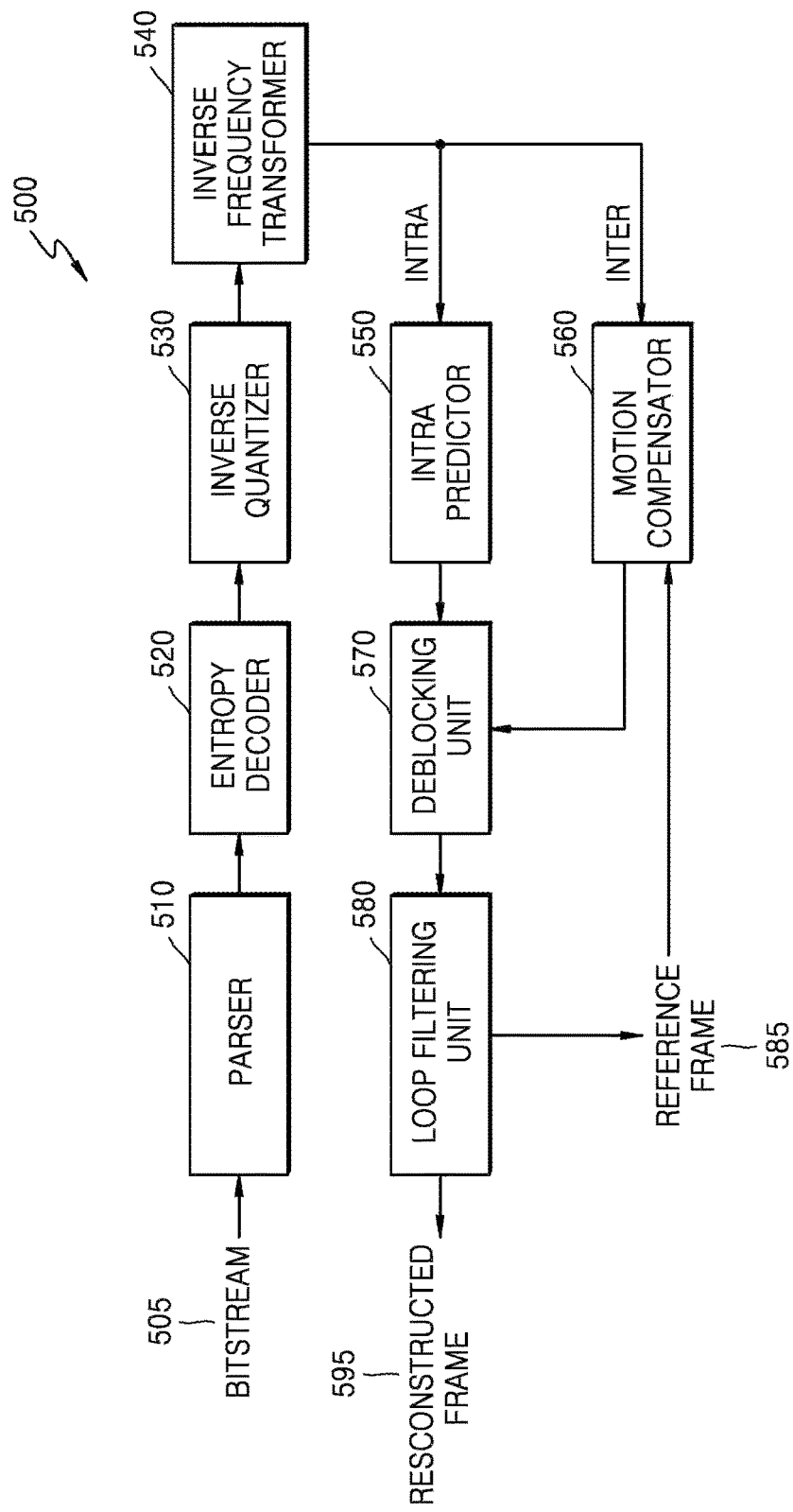
FIG. 5 is a block diagram of an image decoder based on coding units, according to an exemplary embodiment.

FIG. 5 is a block diagram of an image decoder 500 based on coding units, according to an exemplary embodiment.

A parser 510 parses encoded image data to be decoded and information about encoding used for decoding from a bitstream 505. The encoded image data is output as inverse quantized data through an entropy decoder 520 and an inverse quantizer 530, and the inverse quantized data is reconstructed to image data in a spatial domain through an inverse frequency transformer 540.

An intra predictor 550 performs intra prediction on coding units in an intra mode with respect to the image data in the spatial domain, and a motion compensator 560 performs motion compensation on coding units in an inter mode by using a reference frame 585. Specifically, the motion compensator 560 according to an exemplary embodiment performs bilateral motion compensation in pixel units in addition to a result obtained by performing bilateral motion compensation based on blocks when performing bilateral motion compensation. This will be described in detail with reference to FIG. 14 below.

The data in the spatial domain, which passed through the intra predictor 550 and the motion compensator 560, may be output as a reconstructed frame 595 after being post-processed through a deblocking unit 570 (e.g., deblocker) and a loop filtering unit 580 (e.g., loop filter or loop filterer). Also, the data, which is post-processed through the deblocking unit 570 and the loop filtering unit 580, may be output as the reference frame 585.

In order to decode the image data in the image data decoder 230 of the video decoding apparatus 200, the image decoder 500 may perform operations that are performed after operations of the parser 510 are performed.

In order for the image decoder 500 to be applied in the video decoding apparatus 200 according to an exemplary embodiment, all elements of the image decoder 500, i.e., the parser 510, the entropy decoder 520, the inverse quantizer 530, the inverse frequency transformer 540, the intra predictor 550, the motion compensator 560, the deblocking unit 570, and the loop filtering unit 580 perform operations based on coding units having a tree structure for each maximum coding unit.

Specifically, the intra predictor 550 and the motion compensator 560 determine partitions and a prediction mode for each of the coding units having the tree structure, and the inverse frequency transformer 540 determines a size of a transformation unit for each coding unit.

Figure 6:
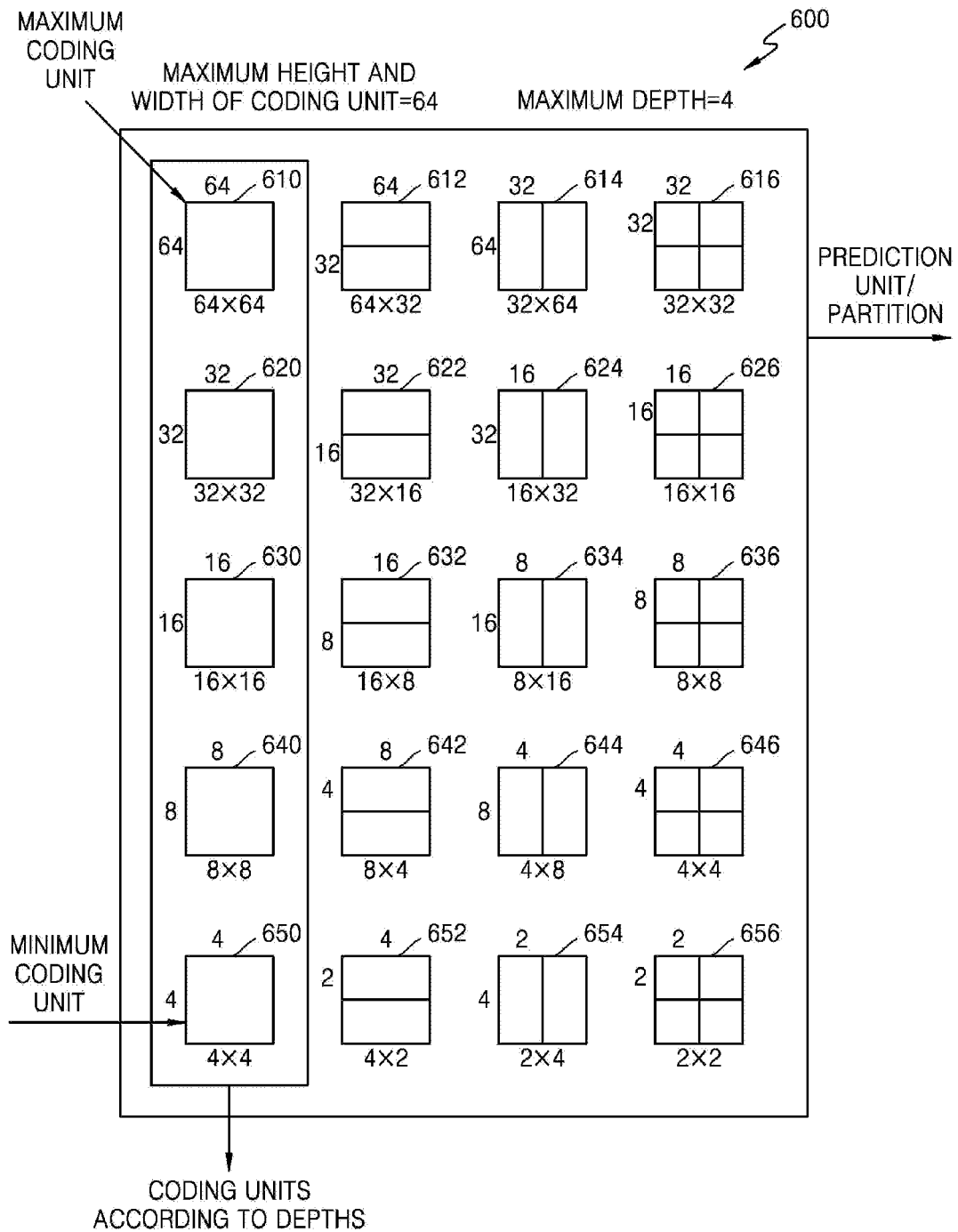
FIG. 6 is a diagram illustrating coding units according to depths and partitions, according to an exemplary embodiment.

FIG. 6 is a diagram illustrating coding units according to depths and partitions, according to an exemplary embodiment.

The video encoding apparatus 100 according to an exemplary embodiment and the video decoding apparatus 200 according to an exemplary embodiment use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the maximum size of the coding unit which is previously set.

In a hierarchical structure 600 of coding units according to an exemplary embodiment, the maximum height and the maximum width of the coding units are each 64, and the maximum depth is 4. Since a depth increases along a vertical axis of the hierarchical structure 600 of the coding units according to an exemplary embodiment, a height and a width of the deeper coding unit are each split. Also, a prediction unit and partitions, which are bases for prediction encoding of each deeper coding unit, are shown along a horizontal axis of the hierarchical structure 600 of the coding units.

In other words, a coding unit 610 is a maximum coding unit in the hierarchical structure 600 of the coding units, wherein a depth is 0 and a size, i.e., a height by width, is 64×64. The depth increases along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4. The coding unit 650 having the size of 4×4 and the depth of 4 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions included in the coding unit 610, i.e., a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e., a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e., a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e., a partition having a size of 8×8 included in the coding unit 640, partitions 642 having a size of 8×4, partitions 644 having a size of 4×8, and partitions 646 having a size of 4×4.

Finally, the coding unit 650 having the size of 4×4 and the depth of 4 is the minimum coding unit and a coding unit of a lowermost depth, and a prediction unit thereof may also be set to a partition 650 having a size of 4×4 only.

In order to determine a coded depth of the maximum coding unit 610, the coding unit determiner 120 of the video encoding apparatus 100 according to an exemplary embodiment performs encoding for coding units corresponding to each depth included in the maximum coding unit 610.

A number of deeper coding units according to depths including data in the same range and the same size increases as the depth increases. For example, four coding units corresponding to a depth of 2 are used to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding according to each depth, a representative encoding error that is a least encoding error in the corresponding depth may be selected by performing encoding for each prediction unit in the deeper coding units, along the horizontal axis of the hierarchical structure 600 of the coding units. Alternatively, the least encoding error may be searched for by comparing representative encoding errors according to depths by performing encoding for each depth as the depth increases along the vertical axis of the hierarchical structure 600 of the coding units. A depth and a partition having the least encoding error in the maximum coding unit 610 may be selected as the coded depth and a partition type of the maximum coding unit 610.

FIG. 7 is a diagram for describing a relationship between a coding unit 710 and transformation units 720, according to an exemplary embodiment.

The video encoding apparatus 100 according to an exemplary embodiment or the video decoding apparatus 200 according to an exemplary embodiment encodes or decodes an image according to coding units having sizes smaller than or equal to a maximum coding unit for each maximum coding unit. Sizes of transformation units for frequency transformation during encoding may be selected based on data units that are not larger than a corresponding coding unit.

For example, in the video encoding apparatus 100 according to an exemplary embodiment or the video decoding apparatus 200 according to an exemplary embodiment, if a size of the current coding unit 710 is 64×64, frequency transformation may be performed by using the transformation units 720 having a size of 32×32.

Also, data of the coding unit 710 having the size of 64×64 may be encoded by performing the frequency transformation on each of the transformation units having the size of 32×32, 16×16, 8×8, and 4×4, which are smaller than 64×64, and then a transformation unit having a least error with respect to the original may be selected.

FIG. 8 is a diagram for describing encoding information of coding units corresponding to a coded depth, according to an exemplary embodiment.

The output unit 130 of the video encoding apparatus 100 according to an exemplary embodiment may encode and transmit information 800 about a partition type, information 810 about a prediction mode, and information 820 about a size of a transformation unit for each coding unit corresponding to a coded depth, as information about an encoding mode.

The information 800 about the partition type indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about the partition type of the current coding unit is set to indicate one of the partition 804 having a size of 2N×N, the partition 806 having a size of N×2N, and the partition 808 having a size of N×N.

The information 810 about the prediction mode indicates a prediction mode of each partition. For example, the information 810 about the prediction mode may indicate a mode of prediction encoding performed on a partition indicated by the information 800, i.e., an intra mode 812, an inter mode 814, or a skip mode 816.

Also, the information 820 about the size of the transformation unit indicates a transformation unit to be based on when frequency transformation is performed on a current coding unit. For example, the transformation unit may be a first intra transformation unit 822, a second intra transformation unit 824, a first inter transformation unit 826, or a second intra transformation unit 828.

The image data and encoding information extractor 210 of the video decoding apparatus 200 according to an exemplary embodiment may extract and use the information 800 about the partition type, the information 810 about the prediction mode, and the information 820 about the size of the transformation unit for decoding according to each deeper coding unit.

Figure 9:
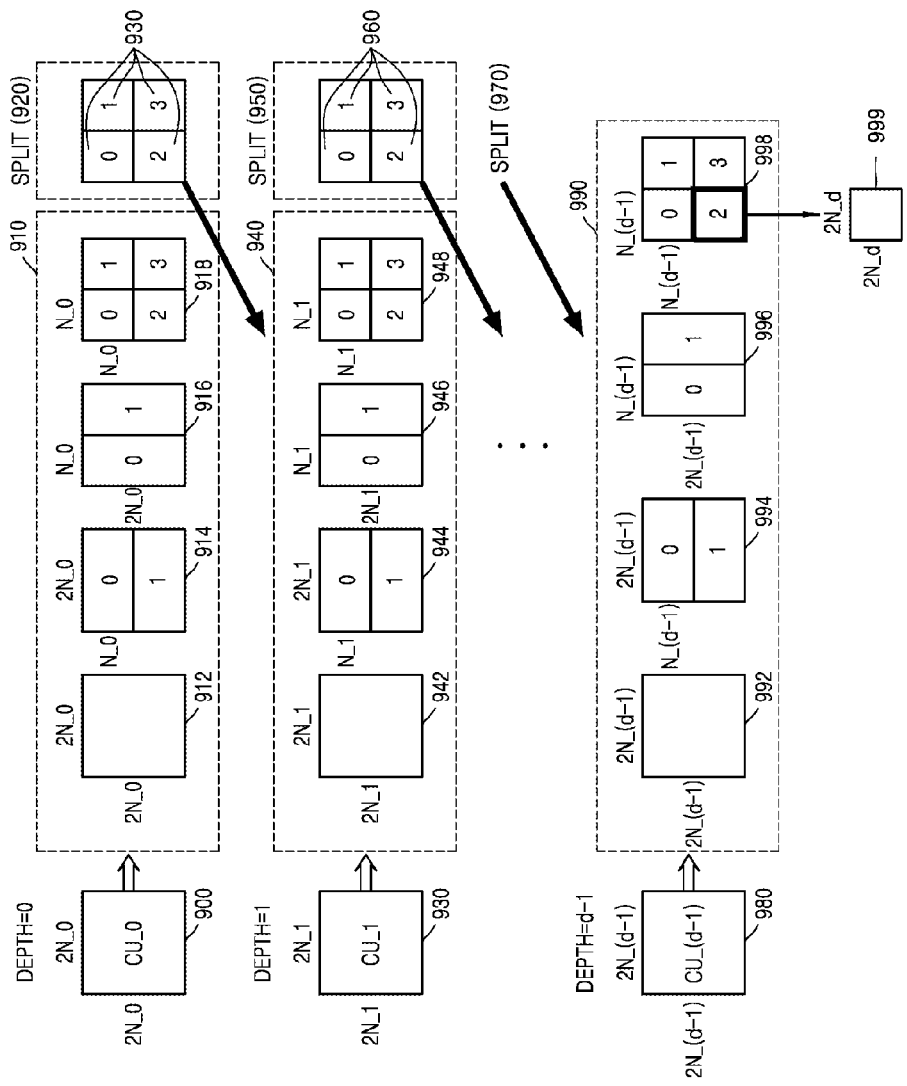
FIG. 9 is a diagram of coding units according to depths, according to an exemplary embodiment.

FIG. 9 is a diagram of coding units according to depths according to an exemplary embodiment.

Split information may be used to indicate a change of a depth. The spilt information indicates whether a coding unit of a current depth is split into coding units of a lower depth.

A prediction unit 910 for prediction encoding of a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape in one or more other exemplary embodiments.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode may be performed only on the partition having the size of 2N_0×2N_0.

If an encoding error is smallest in one of the partition types 912 through 916 having the sizes of 2N_0×2N_0, 2N_0×N_0, and N_0×2N_0, the prediction unit 910 may be no longer split to a lower depth.

If the encoding error is the smallest in the partition type 918 having the size of N_0×N_0, a depth may be changed from 0 to 1 to split the partition type 918 in operation 920, and encoding may be repeatedly performed on coding units 930 having a depth of 2 and a size of N_0×N_0 to search for a least encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948 having the size of N_1×N_1, a depth may be changed from 1 to 2 to split the partition type 948 in operation 950, and encoding may be repeatedly performed on coding units 960, which have a depth of 2 and a size of N_2×N_2 to search for a least encoding error.

When a maximum depth is d, split information according to each depth may be set until a depth becomes d−1, and split information may be set until a depth becomes d−2. In other words, when encoding is performed until the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a least encoding error.

Even when the partition type 998 having the size of N_(d−1)×N_(d−1) has the least encoding error, since a maximum depth is d, a coding unit CU_(d−1) having a depth of d−1 may be no longer split to a lower depth, a coded depth for a current maximum coding unit 900 may be determined to be d−1, and a partition type of the current maximum coding unit 900 may be determined to be N_(d−1)×N_(d−1). Also, since the maximum depth is d, split information for a coding unit 952 having a depth of d−1 is not set.

A data unit 999 may be referred to as a 'minimum unit' for the current maximum coding unit. A minimum unit according to an exemplary embodiment may be a rectangular data unit obtained by splitting a minimum coding unit having a lowermost coded depth by 4. By performing the encoding repeatedly, the video encoding apparatus 100 according to an exemplary embodiment may select a depth having a least encoding error by comparing encoding errors according to depths of the coding unit 900 to determine a coded depth, and may set a corresponding partition type and a prediction mode as an encoding mode of the coded depth.

As such, the least encoding errors according to depths are compared in all of the depths of 0, 1, . . . , d, and a depth having the least encoding error may be determined as a coded depth. The coded depth, the partition type of the prediction unit, and the prediction mode may be encoded and transmitted as information about an encoding mode. Also, since a coding unit is split from a depth of 0 to the coded depth, only split information of the coded depth may be set to 0, and split information of depths excluding the coded depth may be set to 1.

The image data and encoding information extractor 220 of the video decoding apparatus 200 according to an exemplary embodiment may extract and use the information about the coded depth and the prediction unit of the coding unit 900 to decode the coding unit 912. The video decoding apparatus 200 according to an exemplary embodiment may determine a depth, in which split information is 0, as a coded depth by using split information according to depths, and may use information about an encoding mode of the corresponding depth for decoding.

Figure 10:
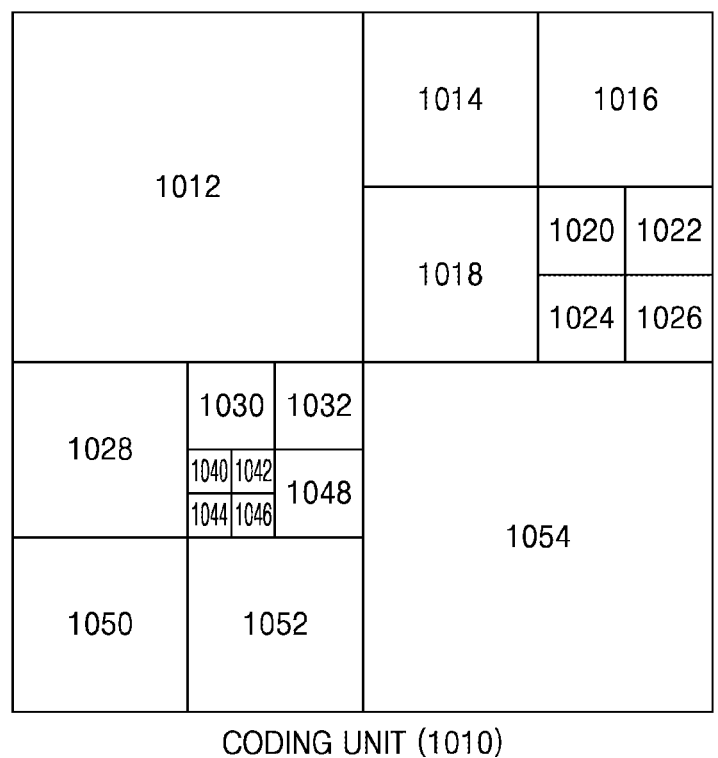
FIGS. 10 through 12 are diagrams for describing a relationship between coding units, prediction units, and transformation units, according to an exemplary embodiment.
Figure 11:
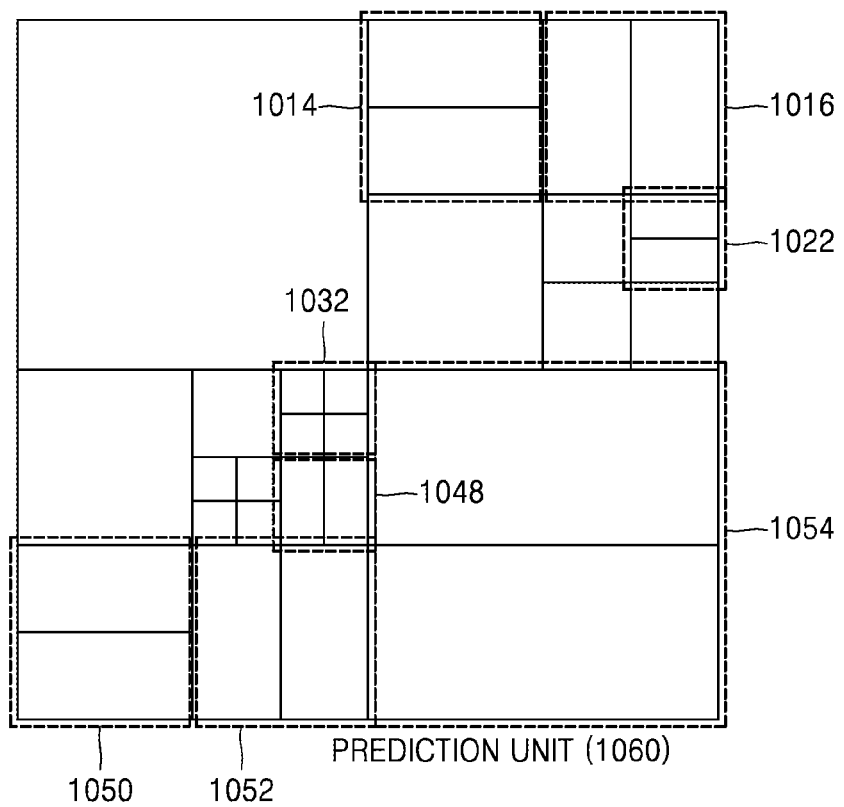
Figure 12:
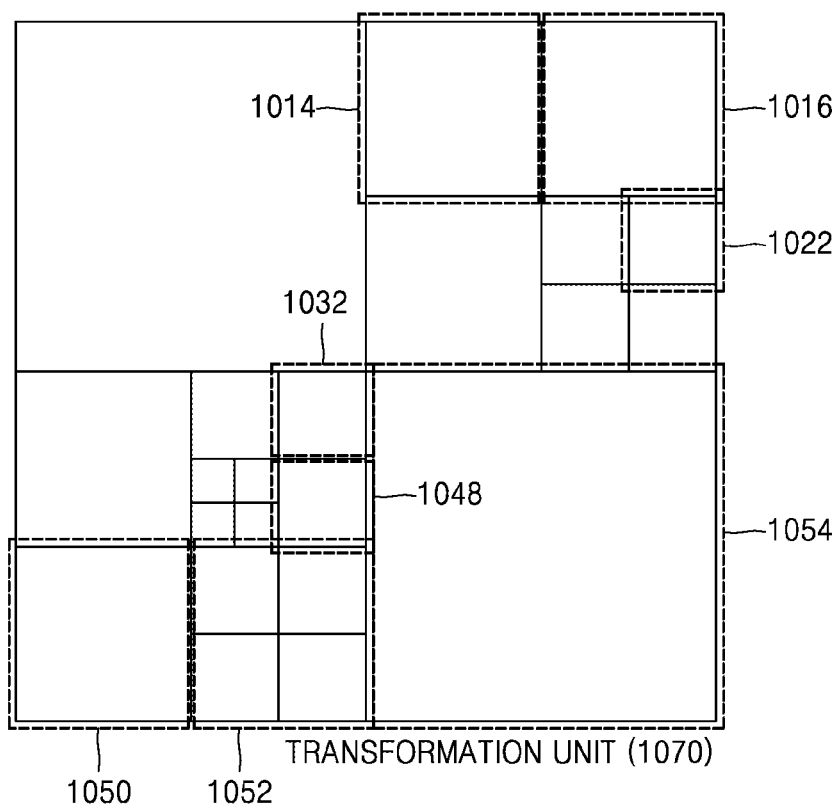

FIGS. 10 through 12 are diagrams for describing a relationship between coding units 1010, prediction units 1060, and frequency transformation units 1070, according to an exemplary embodiment.

The coding units 1010 are coding units corresponding to coded depths determined by the video encoding apparatus 100 according to an exemplary embodiment, in a maximum coding unit. The prediction units 1060 are partitions of prediction units of each of the coding units 1010, and the transformation units 1070 are transformation units of each of the coding units.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some partitions 1014, 1016, 1022, 1032, 1048, 1050, 1052, and 1054 are obtained by splitting the coding units. In other words, partition types in the partitions 1014, 1022, 1050, and 1054 have a size of 2N×N, partition types in the partitions 1016, 1048, and 1052 have a size of N×2N, and a partition type of the partition 1032 has a size of N×N. Prediction units and partitions of the coding units 1010 are smaller than or equal to each coding unit.

Frequency transformation or inverse frequency transformation is performed on image data of the transformation unit 1052 in the transformation units 1070 in a data unit that is smaller than the transformation unit 1052. Also, the transformation units 1014, 1016, 1022, 1032, 1048, 1050, 1052, and 1054 are different from those in the prediction units 1060 in terms of sizes or shapes. In other words, the video encoding apparatus 100 according to an exemplary embodiment and the video decoding apparatus 200 according to an exemplary embodiment may perform intra prediction/motion estimation/motion compensation, and frequency transformation/inverse frequency transformation individually on a data unit even in the same coding unit.

Accordingly, encoding may be recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding apparatus 100 according to an exemplary embodiment and the video decoding apparatus 200 according to an exemplary embodiment.

Split information indicates whether a current coding unit is split into coding units of a lower depth. If split information of a current depth d is 0, a depth, in which a current coding unit is no longer split to a lower depth, is a coded depth, and thus information about a partition type, a prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode may be defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD are respectively obtained by splitting the height of the prediction unit in 1:3 and 3:1, and the asymmetrical partition types having the sizes of nL×2N and nR×2N are respectively obtained by splitting the width of the prediction unit in 1:3 and 3:1.

The size of the transformation unit may be set to be two types in the intra mode and two types in the inter mode. In other words, if split information of the transformation unit is 0, the size of the transformation unit is set to 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be set to N×N, and if the partition type of the current coding unit is an asymmetrical partition type, the size of the transformation unit may be set to N/2×N/2.

TABLE 1

Split Information 0
(Encoding on Coding Unit having Size of 2N × 2N and Current Depth of d)

| Prediction Mode | Partition Type | | Size of Transformation Unit | | Split Information 1 |
|---|---|---|---|---|---|
| | Symmetrical Partition Type | Asymmetrical Partition Type | Split Information 0 of Transformation Unit | Split Information 1 of Transformation Unit | |
| Intra Inter Skip (Only 2N × 2N) | 2N × 2N 2N × N N × 2N N × N | 2N × nU 2N × nD nL × 2N nR × 2N | 2N × 2N | N × N (Symmetrical Type) N/2 × N/2 (Asymmetrical Type) | Repeatedly Encode Coding Units having Lower Depth of d + 1 |

The output unit 130 of the video encoding apparatus 100 according to an exemplary embodiment may output the encoding information about the coding units having the tree structure, and the image data and encoding information extractor 220 of the video decoding apparatus 200 according to an exemplary embodiment may extract the encoding information about the coding units having the tree structure from a received bitstream.

The encoding information about coding units having a tree structure, according to an exemplary embodiment, may be assigned to at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth may be determined by using encoding information of a data unit, and thus a distribution of coded depths in a maximum coding unit may be determined.

Accordingly, if a current coding unit is predicted by referring to adjacent data units, encoding information of data units in deeper coding units adjacent to the current coding unit may be directly referred to and used.

Alternatively, if a current coding unit is prediction encoded by referring to neighboring data units, data units adjacent to the current coding unit in deeper coding units may be searched for by using encoded information of the data units, and the searched adjacent coding units may be referred to for prediction encoding the current coding unit.

Figure 13:
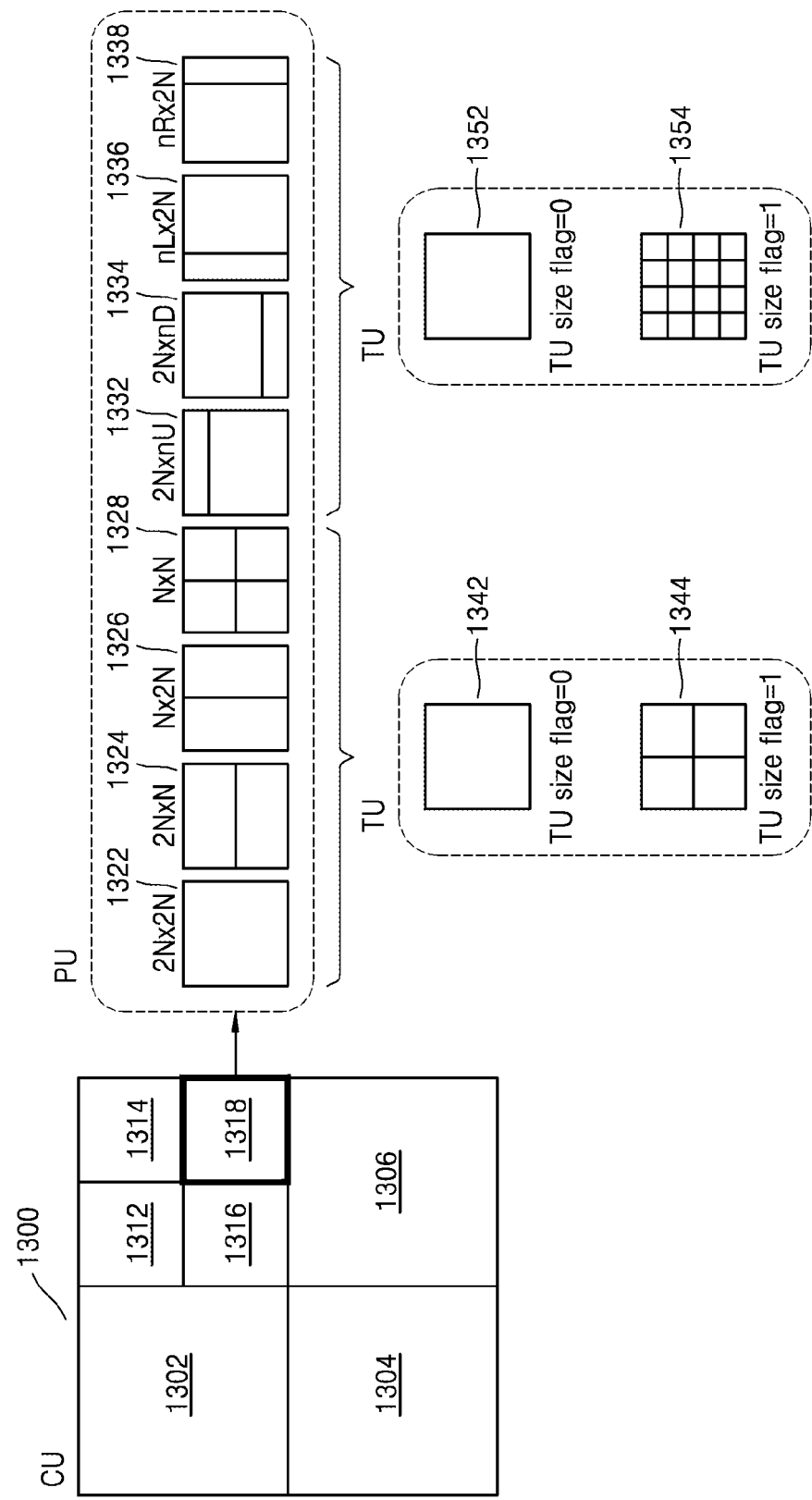
FIG. 13 is a diagram for describing a relationship between a coding unit, a prediction unit, and a transformation unit, according to the encoding mode information of Table 1.

FIG. 13 is a diagram for describing a relationship between a coding unit, a prediction unit, and a transformation unit, according to the encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

For example, when the partition type is set to be symmetrical, i.e., the partition type 1322, 1324, 1326, or 1328, a transformation unit 1342 having a size of 2N×2N is set if split information (TU size flag) of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

A multi-layer video encoding method and a multi-layer video decoding method according to exemplary embodiments will be described below with reference to FIGS. 14 through 30. Hereinafter, the term 'image' may refer to a still image or a moving picture, that is, a video itself. Also, an encoding order is an order according to which images are processed on an encoder side, and a decoding order is an order according to which images are processed on a decoder side. The encoding order and the decoding order are identical. Thus, an encoding order may refer to a decoding order, or a decoding order may refer to an encoding order below. Also, a multi-layer video may refer to a multi-view video or a scalable video consisting of a base layer and an enhancement layer.

Figure 14:
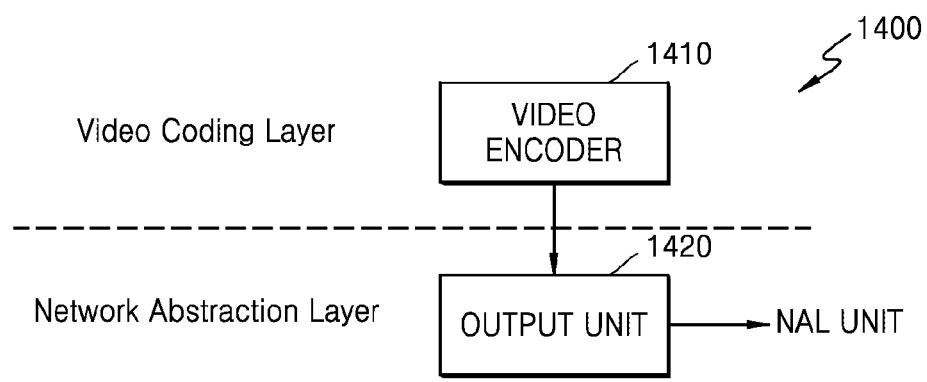
FIG. 14 is a block diagram of a multi-layer video encoding apparatus according to an exemplary embodiment.

FIG. 14 is a block diagram of a multi-layer video encoding apparatus 1400 according to an exemplary embodiment.

Referring to FIG. 14, the multi-layer video encoding apparatus 1400 includes a video encoder 1410 and an output unit 1420 (e.g., outputter or output device).

The video encoder 1410 receives and encodes a multi-layer video. The video encoder 1410 corresponds to a video coding layer handling encoding of the input video.

As described above with reference to FIGS. 1 through 13, the video encoder 1410 according to an exemplary embodiment splits each picture included in a multi-layer video into maximum coding units each having a maximum size, splits each of the split maximum coding units into coding units again, and encodes each picture based on the coding units. The coding units have a tree structure in which the maximum coding units are hierarchically split according to depths. The video encoder 1410 performs prediction on the coding units by using a prediction unit and transforms the coding units by using a residual which is a difference between a prediction value and an original signal.

A multi-layer video may be a multi-view video or a scalable video. When the multi-layer video is multi-view video, the video encoder 1410 encodes each of n (where n is an integer) image sequences as one layer. When the multi-layer video is scalable video, the video encoder 1410 encodes each of an image sequence of a base layer and image sequences of an enhancement layer as one layer.

The multi-layer video has a greater amount of data than that of single layer video. Thus, the video encoder 1410 may perform prediction encoding by using a correlation between layers included in the multi-layer video. In other words, the video encoder 1410 may prediction-encode each layer image by referring to other layer image. A prediction process performed by referring to an image of a current layer and an image of other layers is defined as interlayer prediction.

As an example, the video encoder 1410 may perform inter-view prediction for predicting additional view images with reference to base view images. Also, the video encoder 1410 may perform inter-view prediction for predicting other additional view images with reference to predetermined additional view images. As described above, interlayer prediction may be performed based on a coding unit having a tree structure, a prediction unit, or a transformation unit.

The video encoder 1410 may perform encoding by transforming and quantizing a difference between a prediction value generated through inter prediction, intra prediction and interlayer prediction, and an original signal. Through such an encoding process in a video coding layer (VCL), the video encoder 1410 outputs residual information related to a coding unit, prediction mode information, and additional information related to prediction encoding of the coding unit.

The output unit 1420 corresponds to a network abstraction layer (NAL) that adds and outputs encoded multi-layer video data and additional information to a transmission data unit of a predetermined format. The transmission data unit may be an NAL unit. The output unit 1420 adds prediction encoding data of the multi-layer video output from the video encoder 1410 and additional information related to prediction encoding to the NAL unit and outputs the NAL unit.

In particular, the output unit 1420 classifies pictures included in a first layer, based on an output order and a reference relationship of the pictures included in the first layer, into a first layer random access point (RAP) picture that is randomly accessible, a first layer random access decodable leading (RADL) picture which is among leading pictures that are encoded after the first layer RAP picture but precede the first layer RAP picture in an output order and are reconstructable to the first layer RAP picture during random access based on whether a picture encoded prior to the first layer RAP picture is referred to, and a first layer random access skipped leading (RASL) picture that is not reconstructable. Also, the output unit 1420 sets a type of a corresponding picture of the second layer having the same POC as each picture included in the first layer to be the same as the picture type of the first layer, and outputs a NAL unit including encoding information and type information of the pictures of the first layer and the pictures of the second layer.

In general, when reproducing video data, video data may be reconstructed and reproduced by using one of a trick play method and a normal play method. The trick play method includes a fast forward method, a fast backward method, and a random access method. The normal play method is a method of sequentially reproducing all pictures included in video data. The fast forward method or the fast backward method is a method of selecting and reproducing forward or backward an RAP picture every predetermined cycle according to a reproduction speed. The random access method is a method of skipping and reproducing an RAP picture of a predetermined location. According to the H.264/AVC standard, only an instantaneous decoder refresh (IDR) picture is used as an RAP picture for random access. The IDR picture is an intra picture in which a buffer of a decoding apparatus is refreshed at the instant that the IDR picture is decoded. In more detail, at the instant that the IDR picture is decoded, a decoded picture buffer (DPB) marks a previously decoded picture, excluding the IDR picture, as a picture that is not any longer referred to, and a picture order count (POC) is also initialized. A picture decoded after the IDR picture is always after the IDR picture in an output order, and is decoded without referring to a picture prior to the IDR picture.

According to an exemplary embodiment, a clean random access (CRA) picture and a broken link access (BLA) picture are used as an RAP picture for random access, other than the IDR picture. A temporal sublayer access (TSA) picture and a stepwise temporal sublayer access (STSA) picture are used to support temporal scalability.

As described above, the reason why various RAP pictures are used for the random access, other than the IDR picture, is that prediction efficiency of the IDR picture is low since the IDR picture is limited to a coding structure known as a closed group of pictures (GOP). As described above, the picture decoded after the IDR picture may not refer to the picture prior to the IDR picture. As such, a coding structure in which the picture prior to the IDR picture is not referred to is referred to as the closed GOP. To improve prediction efficiency, a leading picture, which is a picture that is output after the RAP picture in an output order but is decoded after the RAP picture, may be allowed to refer to the picture decoded prior to the RAP picture without being limited to a reference picture. A coding structure in which the picture decoded prior to the RAP picture is allowed as the reference picture is referred to as an open GOP. Compared to a case where the IDR picture to which the reference picture is limited is used, a new type of an RAP picture using the open GOP is defined, thereby improving prediction efficiency.

In order to identify which type of a picture included in a current NAL unit is, the output unit 1420 may include type information in a header of the NAL unit, indicating information regarding which type of picture is included in the current NAL unit.

Meanwhile, when decoding a multi-layer video, layer switching whereby decoded layers are switched is possible. For example, in a scalable video consisting of a base layer and an enhancement layer, decoding may be performed by switching a base layer to an enhancement layer while reproducing pictures of the base layer. As another example, while reproducing a picture of a first view in a multi-view video, a picture of a second view may be reproduced by layer switching. According to an exemplary embodiment, types of corresponding pictures of a multi-layer are set to homogeneous pictures during an encoding process on a multi-layer video. The corresponding pictures refer to pictures having the same picture order count (POC) transmitted via the same access unit from among pictures included in the multi-layer.

Figure 27:
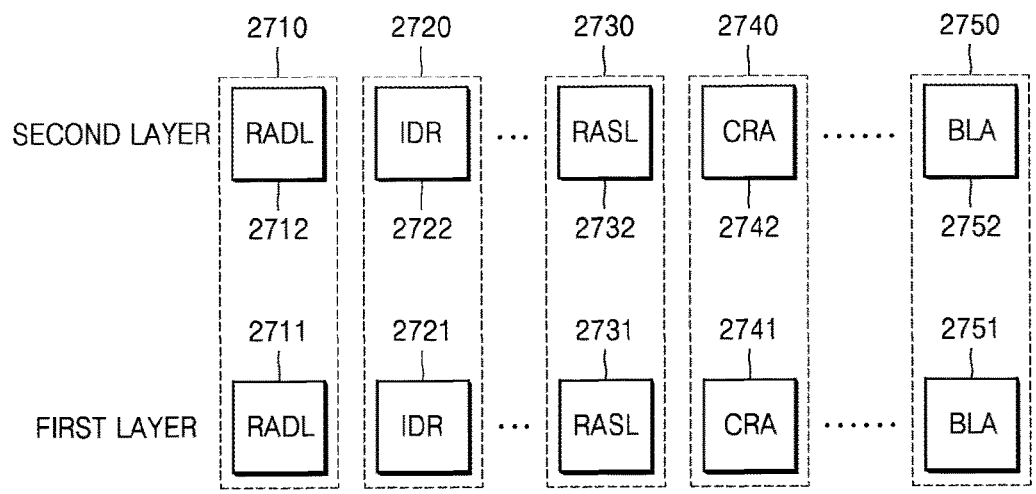
FIG. 27 illustrates type information of a corresponding picture among multi-layer pictures, according to an exemplary embodiment.

FIG. 27 illustrates type information of a corresponding picture among multi-layer pictures according to an exemplary embodiment.

Referring to FIG. 27, when a picture 2721 of a first layer is an IDR picture, a picture 2722 of a second layer included in the same access unit 2720 is also set to an IDR picture, and when a picture 2741 of the first layer is a CRA picture, a corresponding picture 2742 of the second layer included in the same access unit 2740 is also set to a CRA picture. Also, when a picture 2751 of the first layer is a BLA picture, a picture 2752 of the second layer included in the same access unit 2750 is also set to a BLA picture. Also, when a picture 2731 of the first layer is a RASL picture, a picture 2732 of the second layer included in the same access unit 2750 is also set to a RASL picture, and when a picture 2711 of the first layer is a RADL picture, a picture 2712 of the second layer included in the same access unit 2710 is also set to a RADL picture. The reason why corresponding pictures of a multi-layer are set to homogeneous pictures is to prevent a malfunction caused by mismatch of POCs during layer switching and an unreconstructable picture by referring to a picture that cannot be referred to during switching.

According to the multi-layer video encoding apparatus 1400 according to another exemplary embodiment, pictures following the second layer RAP picture in an encoding order and an output order are second layer RAP pictures that are interlayer predicted by referring to another layer that is different from the second layer from among pictures included in the second layer, which is an upper layer of the first layer, and do not refer to other pictures preceding the second layer RAP picture in one of an encoding order or an output order. When a picture precedes the second layer RAP picture in an encoding order and always precedes the second layer RAP picture in an output order, the second layer RAP picture is newly defined as a view layer access (VLA) picture. A VLA picture of the second layer is a picture that is interlayer predicted by referring to only other layers, and does not refer to a picture of the same layer.

The reason why a VLA picture is defined is to skip a decoding process on a RADL picture or a RASL picture prior to the second layer VLA picture when decoding starts from the second layer VLA picture during layer switching, so that switching between layers is performed easily. As described above, the second layer VLA picture is a picture that is predicted by interlayer prediction where only previous pictures of other layers are referred to, and does refer to other pictures of the second layer. Also, a picture preceding the second layer VLA picture in a decoding order also precedes the second layer VLA picture in an output order. Accordingly, during layer switching, when decoding starts from the second layer VLA picture, seamless reproduction is possible. Also, since the second layer VLA picture is not an IDR picture, a POC is not reset, and the second layer VLA picture maintains a same value as a POC of a previous layer. Thus, reproduction errors due to mismatch of POCs during layer switching may be prevented. Also, when a random access to the second layer VLA picture is caused by layer switching during reproduction of a first layer picture, a decoding process on a RADL picture and RASL pictures referring to pictures that are decoded prior to the second layer VLA picture and preceding the second layer VLA picture in an output order may be skipped.

Figure 28:
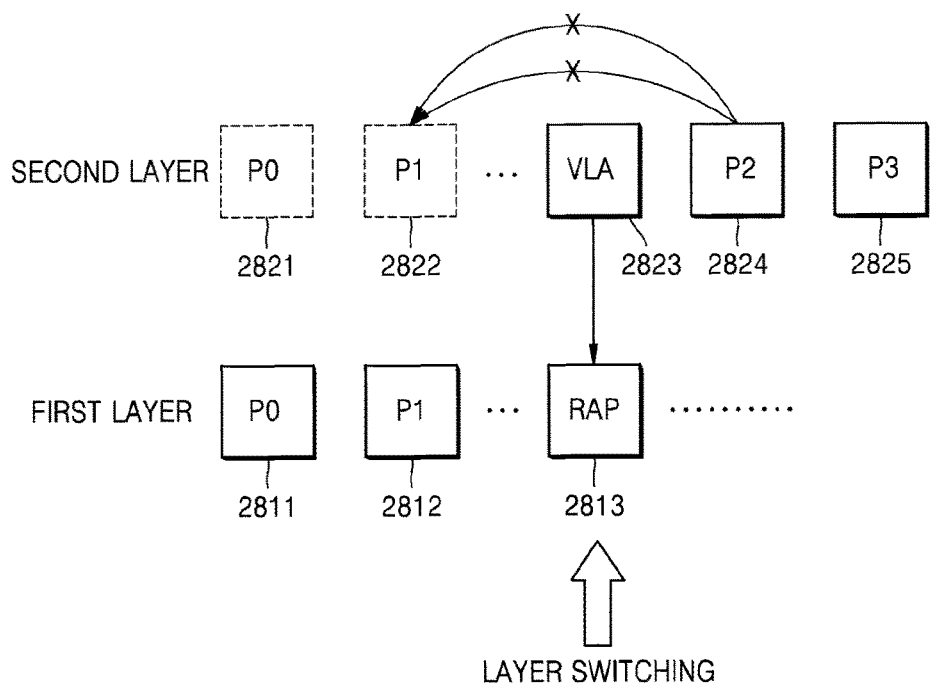
FIG. 28 illustrates a VLA picture according to an exemplary embodiment.

FIG. 28 illustrates a VLA picture 2823 according to an exemplary embodiment.

Referring to FIG. 28, a VLA picture 2823 of a second layer is an interlayer predicted picture by referring to a RAP picture 2813 of a first layer. A picture which the VLA picture 2823 refers to may be pictures of other layers, and does not necessarily have to be a RAP picture. While FIG. 28 illustrates that the VLA picture 2823 predicts the RAP picture 2813, a reference picture referred to by the VLA picture 2823 may be a non-RAP picture of other layers. As described above, pictures P2, P3 2823, 2825 following the VLA picture 2823 in an encoding order and an output order do not refer to other pictures P0, P1 2821, 2922 prior to the VLA picture in one of an encoding order or an output order. When using the VLA picture 2823, and if layer switching is generated while reproducing a picture P0 2811, a picture P1 2812, and the RAP picture 2813 of the first layer, the VLA picture 2823 uses only the RAP picture 2813 of the first layer that was previously being reproduced, as a reference picture, and the pictures P2, P3 2824, 2825 following the VLA picture 2823 in an encoding order and an output order do not refer to other pictures P0, P1 2821, 2922 preceding the VLA picture 2823 in one of an encoding order and an output order, when reproduction is performed from the VLA picture among pictures of switched layers during layer switching, seamless reproduction may be possible. A NAL unit including the second layer VLA picture may be identified based on type information of a NAL unit (NAL unit type).

Figure 15:
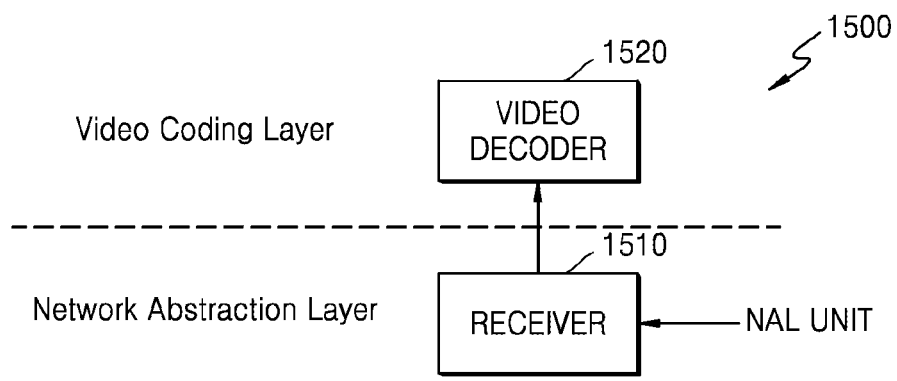
FIG. 15 is a block diagram illustrating a multi-layer video decoding apparatus according to an exemplary embodiment.

FIG. 15 is a block diagram illustrating a multi-layer video decoding apparatus 1500 according to an exemplary embodiment.

Referring to FIG. 15, the multi-layer video decoding apparatus 1500 includes a receiver 1510 and a video decoder 1520.

The receiver 1510 may obtain a NAL unit including encoding information and type information of a first layer picture and a NAL unit including encoding information and type information of a second layer picture. As described above, corresponding pictures of a multi-layer are set to homogeneous pictures. Also, the receiver 1510 may identify a VLA picture for free layer switching defined according to another exemplary embodiment based on type information of a NAL unit (NAL unit type).

The video decoder 1520 identifies a type of the first layer picture, based on the type information of the first layer picture included in the NAL unit, from among a first layer RAP picture that is randomly accessible, a first layer RADL picture which is among leading pictures that are decoded after the first layer RAP picture but precede the first layer RAP picture in an output order and are decodable to the first layer RAP picture during random access based on whether a picture decoded prior to the first layer RAP picture is referred to, and a first layer RASL picture that is not decodable. Also, the video decoder 1520 identifies a type of a second layer picture set to be the same as a type of the first layer picture having the same POC based on type information of the second layer picture included in a NAL unit. Also, the video decoder 1520 decodes the first layer picture and the second layer picture based on the identified first layer picture type and the identified second layer picture type. The video decoder 1520 may decode each picture of the multi-layer based on a coding unit having a tree structure, a prediction unit, and a transformation unit.

The video decoder 1520 may independently decode encoded data of each layer or may use information about a previous layer that is previously decoded, as reference information when decoding other layers. The video decoder 1520 starts decoding from a RAP picture of each layer during random access or layer switching. As described above, corresponding pictures having the same POC of a multi-layer are set as pictures of the same type, and thus, seamless reproduction during layer switching may be possible or a reproduction error due to unavailability of a reference picture may be prevented.

The video decoder 1520 reconstructs a residual by performing entropy decoding, inverse quantization, inverse transformation on pictures of the encoded multi-layer, generates a prediction signal by applying at least one prediction method among intra prediction, interprediction, and interlayer prediction, and performs decoding by adding the reconstructed residual and the prediction signal.

The video decoder 1520 may decode an IDR picture, a CRA picture, and a BLA picture which are RAP pictures, without referring to other pictures but via intra prediction. If random access or layer switching is generated, the video decoder 1520 may skip a decoding process on a RASL picture and a RADL picture. If random access or layer switching is not generated, a RASL picture and a RADL picture may also be decoded by using a reference picture referred to by the RASL picture and the RADL picture. The video decoder 1520 may decode a VLA picture by referring to previously decoded pictures of other layers.

Figure 16:
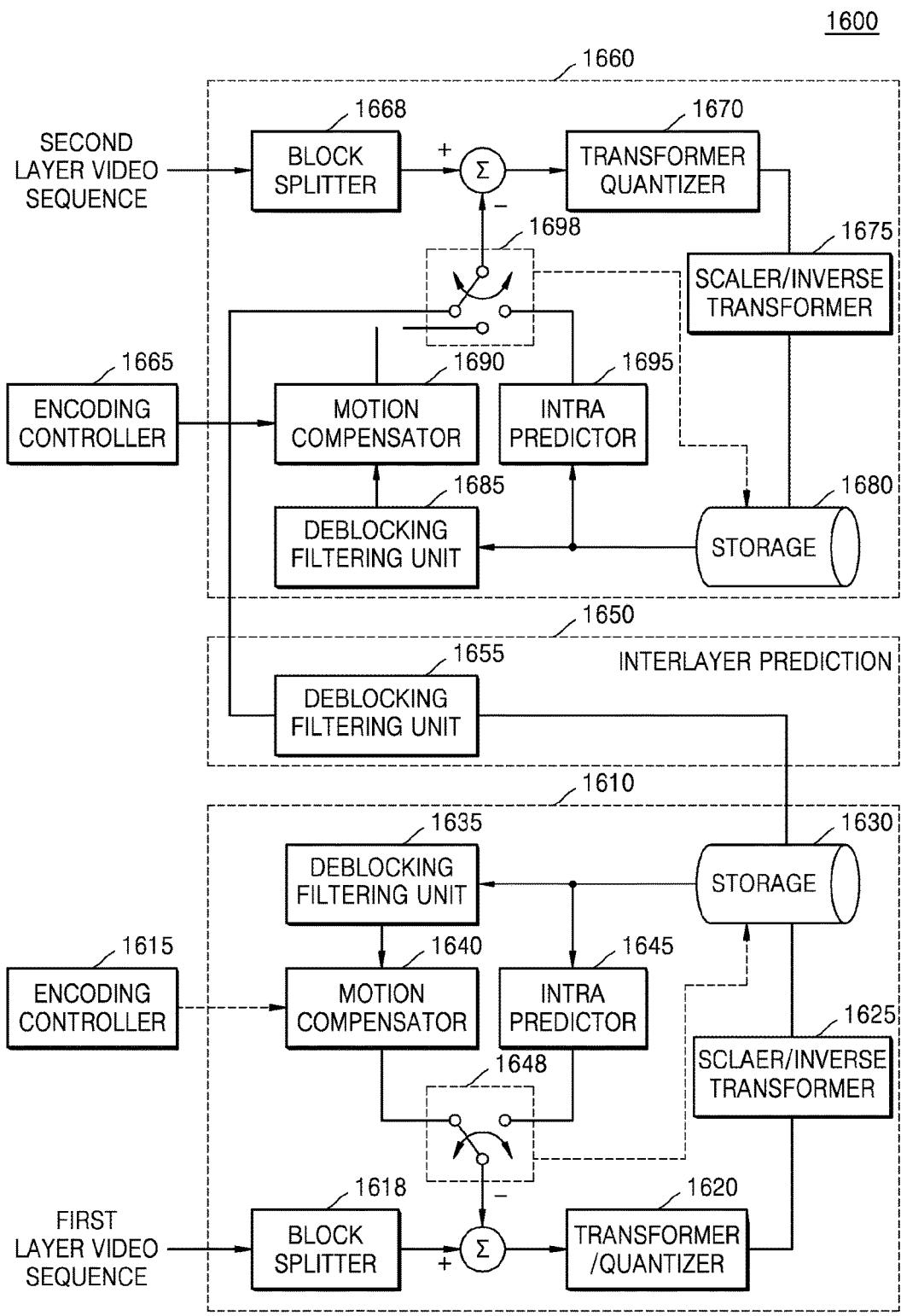
FIG. 16 is a detailed block diagram of a video encoder of FIG. 14.

FIG. 16 is a detailed block diagram of the video encoder 1410 of FIG. 14, according to an exemplary embodiment.

A video encoder 1600 includes a first layer encoding apparatus 1610, a second layer encoding apparatus 1660, and an interlayer predicting apparatus 1650.

A block splitter 1618 of a first layer splits a first layer image into a data unit such as a maximum coding unit, a coding unit, a prediction unit, a transformation unit or the like. Intra prediction or inter prediction on a prediction unit included in a coding unit output from the block splitter 1618 may be performed. A motion compensator 1640 performs inter prediction on a prediction unit to output a prediction value of the prediction unit, and an intra predictor 1645 performs intra prediction on a prediction unit to output a prediction value of the prediction unit.

An encoding controller 1615 determines a prediction mode used to obtain a prediction value that is most similar to a current prediction unit from among an intra prediction mode and an inter prediction mode, and controls a prediction switch 1648 such that the prediction value according to the determined prediction mode is output. A residual which is a difference between a prediction value of a current block obtained by intra prediction or inter prediction and the current block is transformed and quantized by a transformer/quantizer 1620 so as to output a quantized transformation coefficient. A scaler/inverse transfer 1625 performs scaling and inverse transformation on the quantized transformation coefficient to reconstruct the residual. A storage 1630 stores the current block that is reconstructed by adding the reconstructed residual and the prediction value of the current block. An encoding process is repeated on each of all coding units of the first layer image split by the block splitter 1618. A structure of a maximum coding unit, a coding unit, a prediction unit, and a transformation unit of the first layer image having a minimum cost may be determined according to the encoding process on the first layer image as described above. A deblocking filtering unit 1635 (e.g., deblocking filter unit, deblocking filterer, etc.) performs filtering on the reconstructed first layer image to reduce artifacts included in the reconstructed first layer image.

The interlayer predicting apparatus 1650 outputs first layer image information to the second layer encoding apparatus 1660 so that the first layer image may be used in prediction encoding of a second layer image. A deblocking unit 1655 (e.g., deblocking filter unit, deblocker, deblocking filterer, etc.) of the interlayer predictor 1650 performs deblocking filtering on the first layer image that is reconstructed after being encoded, and outputs the filtered first layer image to the second layer encoding apparatus 1680.

The second layer encoder 1660 encodes the second layer image based on encoding information of the first layer image encoded by using the first layer encoding apparatus 1610. The second layer encoding apparatus 1660 may apply encoding information of the first layer image determined by the first layer encoding apparatus 1610 without change or may change the encoding information of the first layer image to determine encoding information to be applied in encoding on the second layer image.

A block splitter 1668 of the second layer splits the second layer image into a data unit such as a maximum coding unit, a coding unit, a prediction unit, a transformation unit or the like. The block splitter 1668 of the second layer may determine a corresponding structure of the data unit of the second layer image based on structure information of the data unit such as a maximum coding unit, a coding unit, a prediction unit or a transformation unit determined with respect to the first layer image.

Intra prediction or inter prediction may be performed on each prediction unit included in a coding unit of the second layer output from the block splitter 1668. A motion compensator 1690 outputs a prediction value by performing inter prediction on the current block, and an intra predictor 1695 outputs a prediction value by performing intra prediction on the current block. A motion compensator 1690 may determine a motion vector of the second layer by scaling a motion vector of a block of the first layer corresponding to a block of the second layer. For example, when a first layer image has a resolution of a*b (a and b are integers), and a second layer image corresponding thereto has a resolution of 2a*2b, and a motion vector of a corresponding block of the first layer is mv_base, 2*mv_base, which is a value obtained by upscaling a motion vector of a first layer block twice based on a resolution ratio between the first layer image and the second layer image, may be determined as a motion vector of a second layer block. Also, the motion compensator 1690 may determine a motion vector of a current block of the second layer by performing independent motion prediction without using the motion vector of the first layer.

An encoding controller 1665 of the second layer determines a prediction mode having a most similar prediction value to the current block of the second layer from among an intra prediction mode and an inter prediction mode, and controls a prediction switch 1698 such that a prediction value of the current block according to the determined prediction mode is output. A residual which is a difference between a prediction value of a current block obtained by intra prediction or inter prediction and the current block is transformed and quantized by a transformer/quantizer 1670 so as to output a quantized transformation coefficient to a scaler/inverse transformer 1675. A storage 1680 reconstructs and stores the current block by adding the reconstructed residual and the prediction value of the current block. A deblocking unit 1685 (e.g., deblocking filter unit, deblocker, deblocking filterer, etc.) performs deblocking filtering on the reconstructed second layer image.

Figure 17:
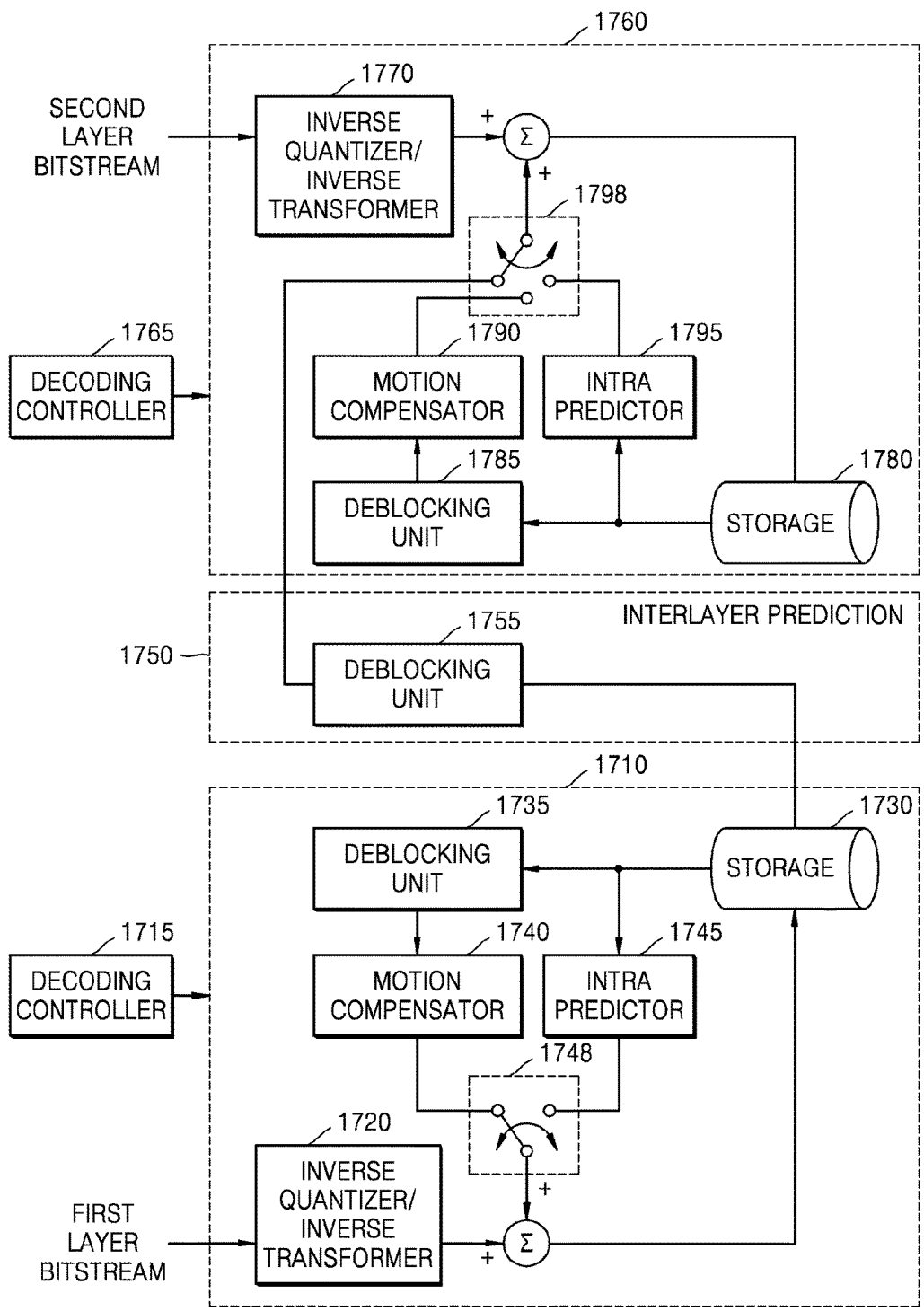
FIG. 17 is a block diagram of a video decoder of FIG. 15.

FIG. 17 is a block diagram of the video decoder 1520 of FIG. 15, according to an exemplary embodiment.

A video decoder 1700 includes a first layer decoding apparatus 1710, a second layer decoding apparatus 1760, and an interlayer prediction apparatus 1750.

When encoding information of a first layer image and encoding information of a second layer image are parsed and input from a bitstream, an inverse quantizer/inverse transformer 1720 outputs residual information that is reconstructed by inversely quantizing and inversely transforming a residual of the first layer image. A motion compensator 1740 performs inter prediction on a current block to output a prediction value, and an intra predictor 1745 performs intra prediction on the current block to output a prediction value.

A decoding controller 1715 determines one of a prediction mode from among an intra prediction mode and an inter prediction mode based on prediction mode information of the current block of the first layer image included in the encoding information of the first layer, and controls a prediction switch 1748 such that a prediction value according to the determined prediction mode is output. The prediction value of the current block obtained by intra prediction or inter prediction and a reconstructed residual are added to reconstruct the current block of the first layer. The reconstructed first layer image is stored in a storage 1730. A deblocking unit 1735 (e.g., deblocking filter unit, deblocker, deblocking filterer, etc.) performs deblocking filtering on the reconstructed first layer image.

An interlayer predicting apparatus 1750 outputs first layer image information to the second layer decoding apparatus 1760 so that the first layer image may be used in prediction decoding of a second layer image. A deblocking unit 1755 (e.g., deblocking filter unit, deblocker, deblocking filterer, etc.) of the interlayer predicting apparatus 1750 performs deblocking filtering on the reconstructed first layer image, and outputs the filtered first layer image to the second layer encoding apparatus 1760.

The second layer decoding apparatus 1760 decodes the second layer image by using encoding information of the first layer image decoded by using the first layer decoding apparatus 1710. The second layer decoding apparatus 1760 may apply encoding information of the first layer image determined by the first layer encoding apparatus 1710 without change or may change the encoding information of the first layer image to determine encoding information to be applied in decoding of the second layer image. An inverse quantizer/inverse transformer 1770 inversely quantize and inversely transform of a residual of the second layer image and outputs reconstructed residual information. A motion compensator 1790 outputs a prediction value by performing inter prediction on a current block of the second layer, and an intra predictor 1795 outputs a prediction value by performing intra prediction on the current block of the second layer. A motion compensator 1790 may determine a motion vector of the current block of the second layer by scaling a motion vector of a corresponding block of the first layer corresponding to the current block of the second layer or may obtain a motion vector of the current block of the second layer based on motion vector information of the current block of the second layer that is independently encoded from the motion vector of the corresponding block of the first layer and is included in a bitstream.

A decoding controller 1765 determines one of a prediction mode from among an intra prediction mode and an inter prediction mode based on prediction mode information included in the encoding information of the second layer image, and controls a prediction switch 1798 such that a prediction block according to the determined prediction mode is output. The prediction value of the current prediction unit of the second layer obtained by intra prediction or inter prediction and a reconstructed residual are added to reconstruct the current block. The reconstructed second layer image is stored in a storage 1780. A deblocking unit 1785 (e.g., deblocking filter unit, deblocker, deblocking filterer, etc.) performs deblocking filtering on the reconstructed second layer image.

Figure 18:
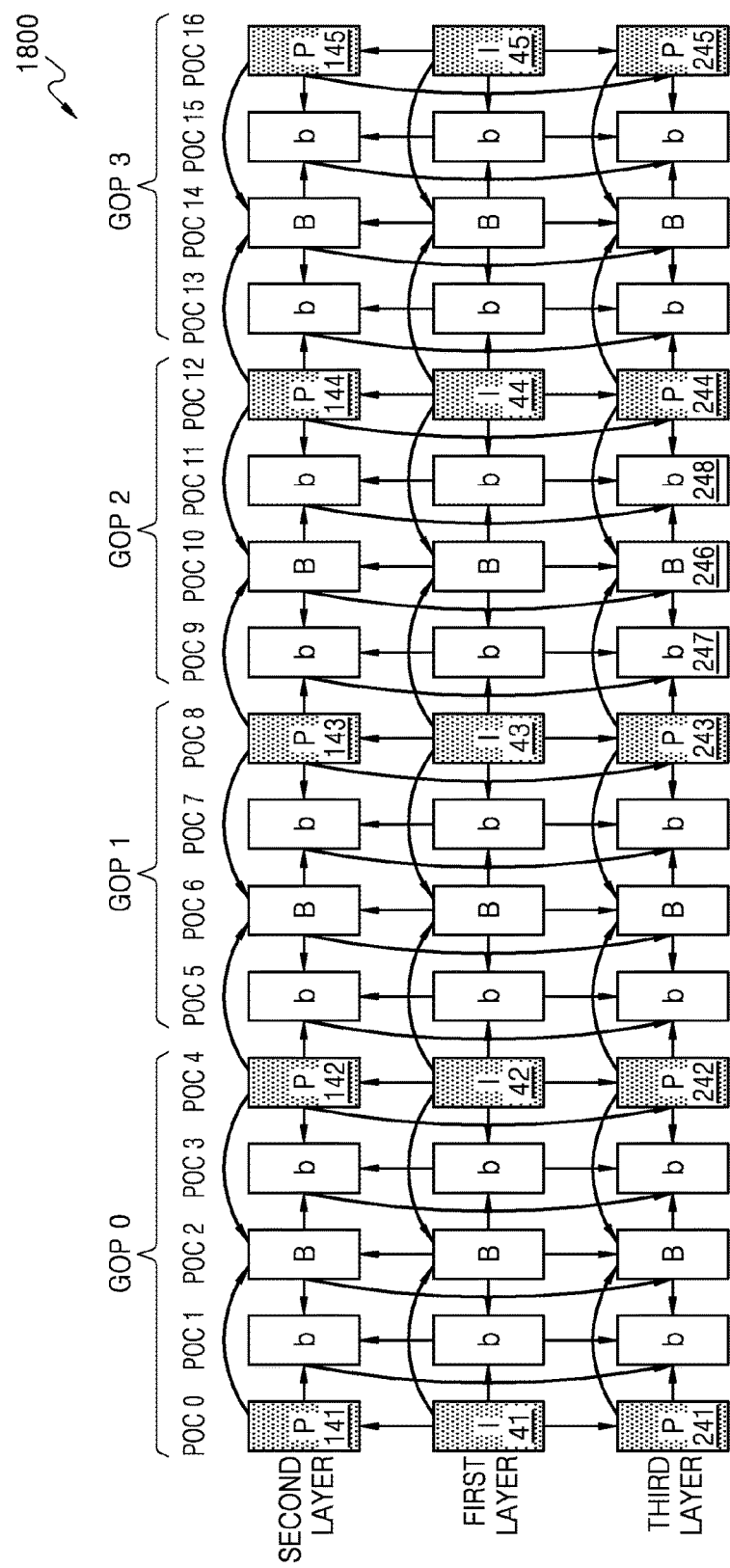
FIG. 18 illustrates an example of a multi-layer prediction structure according to an exemplary embodiment.

FIG. 18 illustrates an example of a multi-layer prediction structure 1800 according to an exemplary embodiment.

In the multi-layer prediction structure 1800 illustrated in FIG. 18, images are arranged according to a reproduction order POC. Also, images having a same POC value are arranged vertically. A POC value of an image indicates a reproduction order of images constituting a video. 'POC X' marked in the multi-layer prediction structure 1800 indicates a reproduction order or images located in its corresponding column, and the smaller X is, the earlier is the reproduction order, and the greater X is, the later is the reproduction order. Images located in a same column in each layer have the same POC value (reproduction order).

Four consecutive images of view images constitute a single group of pictures (GOP) for each layer. Each GOP includes images between consecutive anchor pictures and a single anchor picture. The anchor picture is a random access point, and in this regard, when a predetermined reproduction position is selected from images that are arranged according to a reproduction order of video, that is, according to a POC, an anchor picture of which a POC is closest to the reproduction position is reproduced. First layer images include first layer anchor pictures 41, 42, 43, 44, and 45, second layer images include second layer anchor pictures 141, 142, 143, 144, and 145, and third layer images include third layer anchor pictures 241, 242, 243, 244, and 245.

Multilayer images may be reproduced and predicted (reconstructed) in an order of GOP. First, according to a reproduction order and a reconstruction order of the multi-layer prediction structure 1800 of FIG. 18, for each layer, images included in GOP 0 may be reconstructed and reproduced, and then images included in GOP 1 may be reconstructed and reproduced. That is, images included in respective GOPs may be reconstructed and reproduced in an order of GOP 0, GOP 1, GOP 2, and GOP 3. According to the reproduction order and the reconstruction order of the multi-layer prediction structure 1800, interlayer prediction and inter prediction are performed on the images. In the multi-layer prediction structure 1800, an image from which an arrow starts is a reference image, and an image where the arrow end is an image predicted by using the reference image.

In particular, in the reconstruction order of the multi-layer prediction structure 1800, images are horizontally arranged according to a prediction (reconstruction) order of each image. That is, images located relatively on the left are predicted (reconstructed) relatively earlier, and images located relatively on the right are predicted (reconstructed) relatively later. As subsequent images are predicted (reconstructed) by referring to images reconstructed relatively earlier, arrows, which indicate a prediction direction, between images of the same layer in the reconstruction order of the multi-layer prediction structure 1800 are all in a direction from the images relatively on the left to the images relatively on the right.

In regard to images of the first layer which is a base layer, only pictures in the same layer are used as a reference picture. In regard to images of the second layer and the third layer, interlayer prediction where other layers respectively previously referred to are referred to and inter prediction where images of the same layer are referred to may be performed. Besides the interlayer prediction, inter prediction where pictures of the same layer are referred to may be performed. Anchor pictures 141, 142, 143, 144, 145, 241, 242, 243, 244, and 245 from among the second layer images and the third layer images do not refer to images of the same layer but other images than the anchor pictures may be predicted by referring to images of the same layer. A decoding process for reproducing images is similar to a prediction process. Here, each image may be reconstructed by using a reference image of each image only after the reference image of the image is reconstructed.

Figure 19:
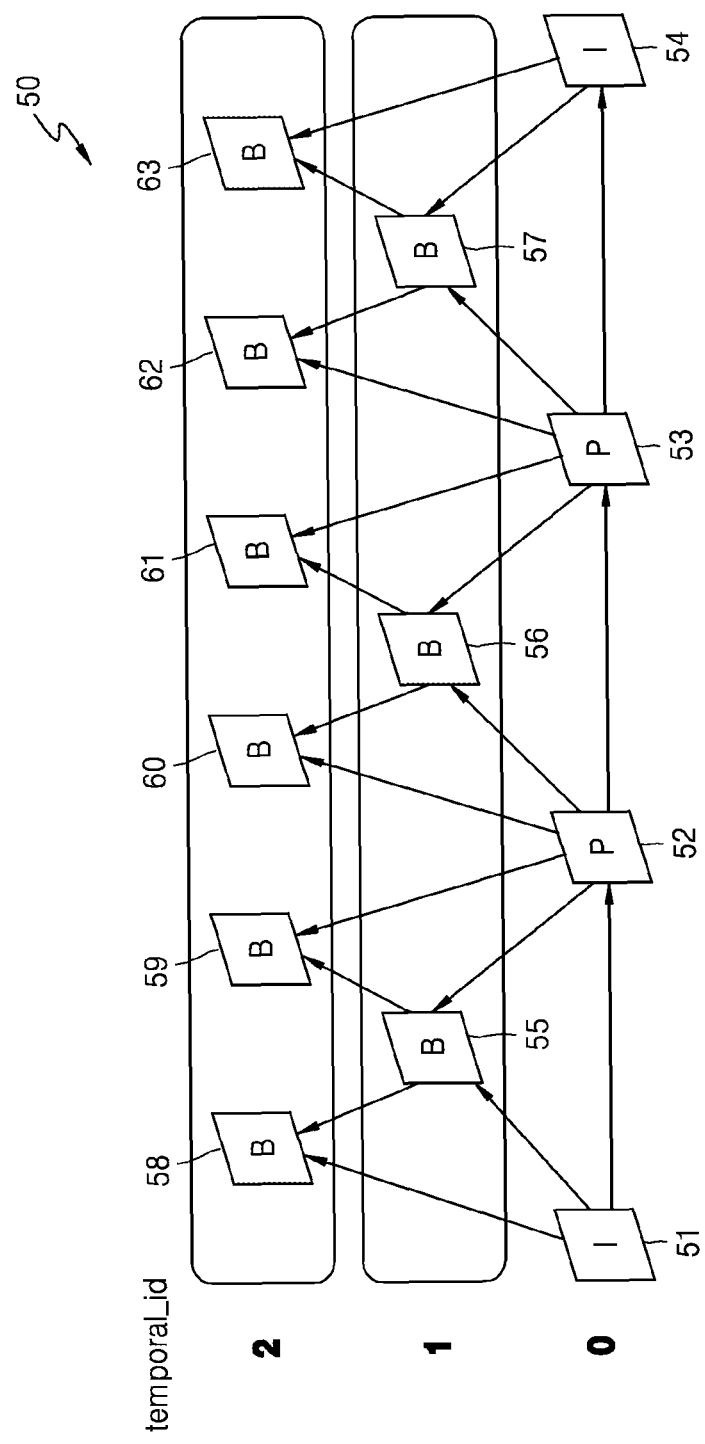
FIG. 19 illustrates a multi-layer prediction structure according to temporal hierarchical encoding and decoding methods.

FIG. 19 illustrates a multi-layer prediction structure 50 according to temporal hierarchical encoding and decoding methods.

A scalable video coding method may be performed according to a temporal hierarchical prediction structure 50. The temporal hierarchical prediction structure 50 includes a prediction structure of hierarchical B type images 55, 56, 57, 58, 59, 60, 61, 62, and 63. In a level 0 prediction structure, inter prediction of I type images 51 and 54 and inter prediction of P type images 52 and 53 are performed. In a level 1 prediction structure, inter prediction of B type images 55, 56, and 57 referring to the I and P type images 51, 52, 53, and 54 is performed. In a level 2 prediction structure, inter prediction where the I and P type images 51, 52, 53, and 54 and the B type images 55, 56, and 57 of level 1 are referred to is performed.

'temporal_id' is a number for identifying a prediction level, and a frame rate may increase as respective images are output. For example, level 0 images 51, 52, 53, and 54 may be decoded and output at a frame rate of 15 Hz, and even level 1 images 55, 56, and 57 are decoded and output, the frame rate increases to 30 Hz, and even level 2 images 58, 59, 60, 61, 62, and 63 are further decoded and output, the frame rate may increase to 60 Hz.

According to an exemplary embodiment, when the temporal hierarchical prediction structure 50 is implemented using a SVC method, the level 0 images are encoded as basic layer images, and the level 1 images may be encoded as first enhancement layer images, and the level 2 images may be encoded as second enhancement layer images.

Figure 20:
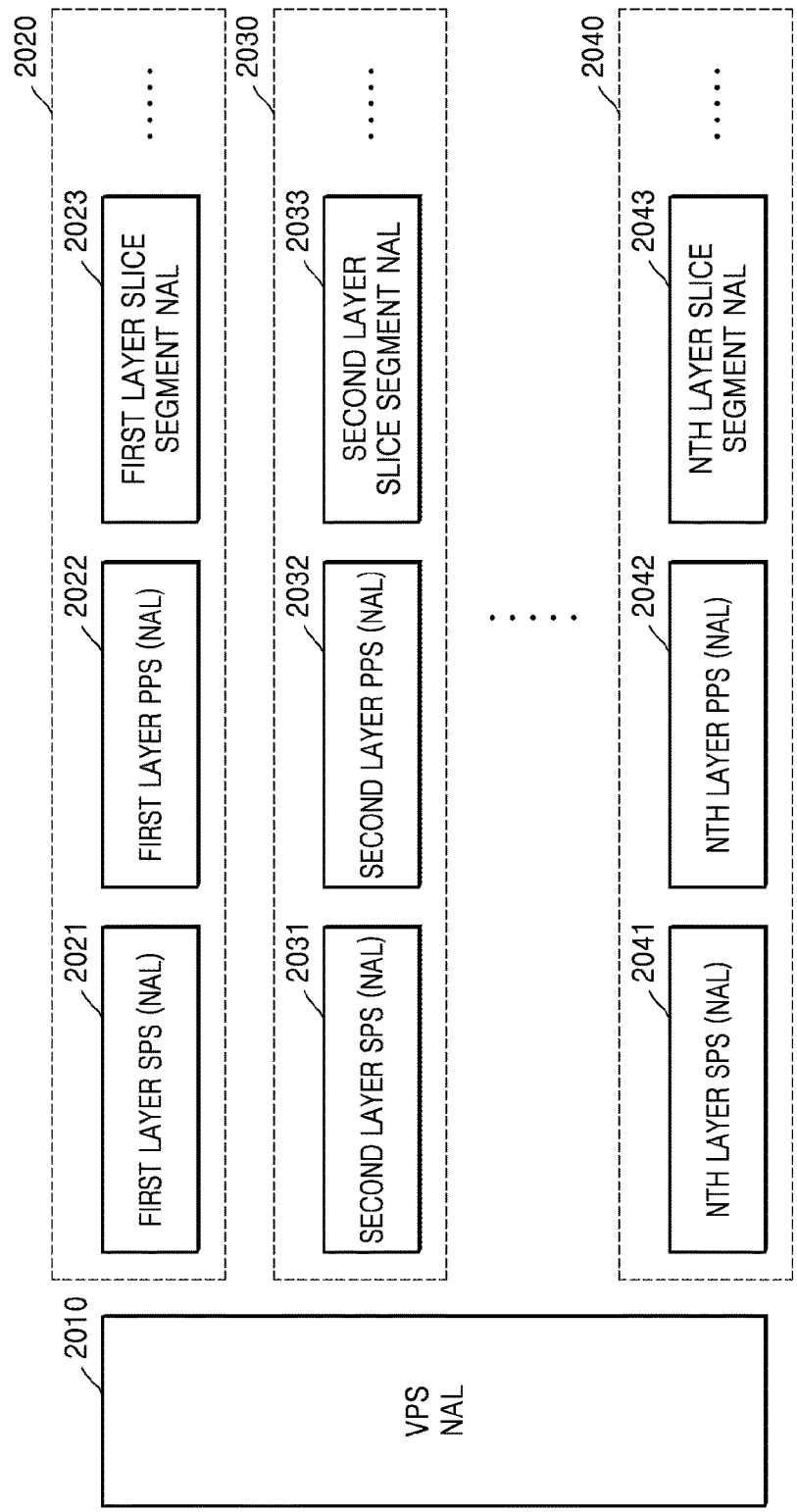
FIG. 20 illustrates NAL units including encoded data of multi-layer video according to an exemplary embodiment.

FIG. 20 illustrates NAL units including encoded data of multi-layer video according to an exemplary embodiment.

As described above, the output unit 1420 outputs the NAL units including the encoded data of the multi-layer video and additional information. A VPS NAL unit 2010 includes information applied to multi-layer image sequences 2020, 2030, and 2040 included in the multi-layer video. The VPS NAL unit 2010 includes a common syntax element shared by the multi-layer image sequences 2020, 2030, and 2040, information regarding an operation point to block transmission of unnecessary information, indispensable information regarding an operation point necessary for a session negotiation like a profile or a level, and the like.

The output unit 1420 may generate and output sequence parameter set (SPS) NAL units 2021, 2031, 2041, picture parameter set (PPS) NAL units 2022, 2032, and 2042, and slice segment NAL units 2023, 2033, and 2043.

An SPS NAL unit includes information commonly applied to an image sequence of one layer. For example, the SPS NAL units 2021, 2031, 2041 respectively include information commonly applied to the image sequences 2020, 2030, 2040. A PPS NAL unit includes information commonly applied to pictures of one layer. For example, each of the PPS NAL units 2022, 2032, and 2042 includes information commonly applied to the pictures of one layer.

The PPS NAL unit may include information regarding an encoding mode of an entire picture, for example, an entropy encoding mode, a quantization parameter initialization value of a picture unit, and the like. The PPS NAL unit may not be necessarily generated for every picture. That is, a decoding side uses a previously received PPS NAL unit when there is no PPS NAL unit. The output unit 1420 may generate and output a new PPS NAL unit when the information included in the PPS NAL unit needs to be updated. A slice segment NAL unit includes information commonly applied to one slice. A slice segment includes encoding data of at least one maximum coding unit and may be transmitted by being included in the slice segment NAL units 2023, 2033, 2043.

The output unit 1420 may generate and output a supplemental enhancement information (SEI) message NAL unit. The SEI message indicates additional information necessary for a decoding process in a video encoding layer (VCL). For example, a SEI message may include timing information of each picture related to a hypothetical reference decoder (HRD), information regarding a pan/scan function, and the like.

FIG. 21 illustrates an example of a header of a NAL unit according to an exemplary embodiment.

Referring to FIG. 21, the header of the NAL unit according to an exemplary embodiment has a total length of 2 bytes. The header of the NAL unit includes forbidden_zero_bit having "0" as a bit for identifying the NAL unit, an ID NAL unit type (NUT) indicating a type of the NAL unit, and a region reserved_zero_6 bits reserved for a future use, and a temporal ID temporal_id. Each of the ID NUT and the region reserved_zero_6 bits reserved for the future use includes 6 bits. The temporal ID temporal_id may include 3 bits. By differently setting a value of nal unit type indicating a type of data including in a NAL unit, type information of various types of pictures included in the multi-layer video described above may be signaled.

The IDR picture, the BLA picture, and the CLA picture which are RAP pictures for the random access will now be described below.

Figure 22:
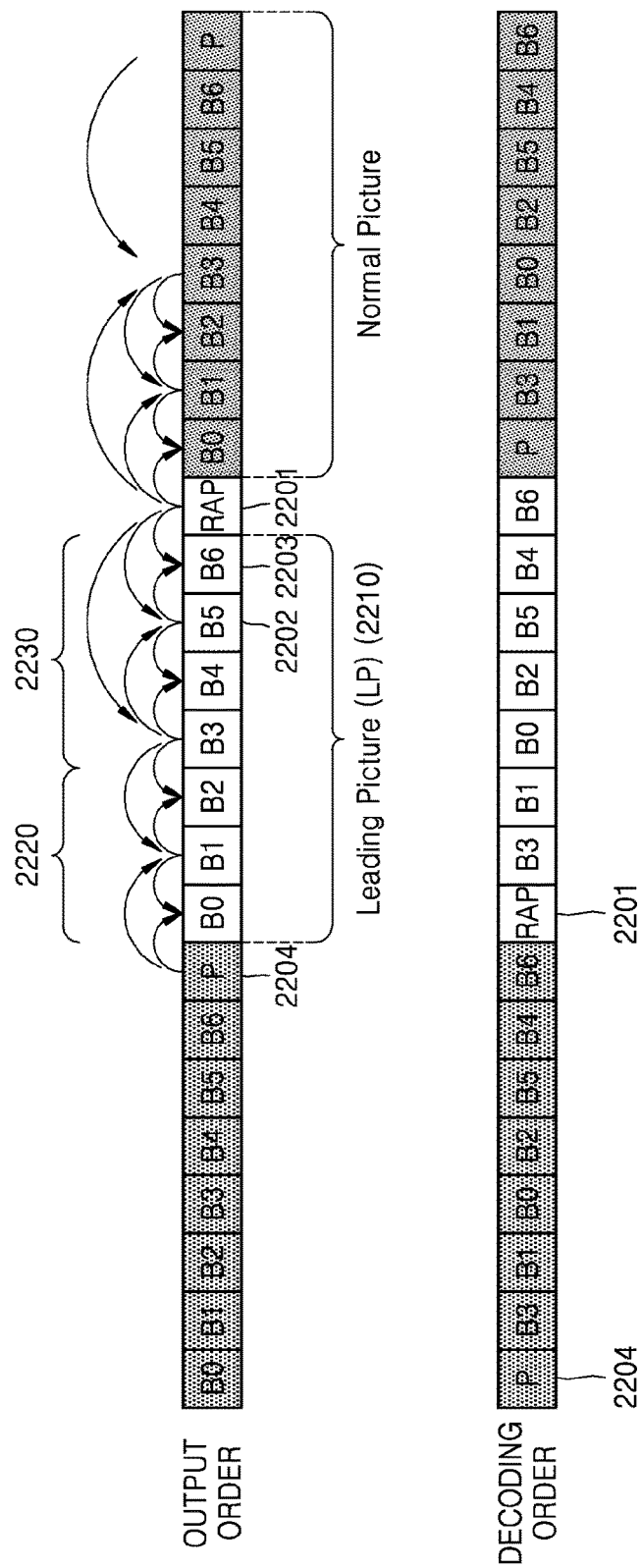
FIG. 22 is a reference view for explaining a leading picture according to an exemplary embodiment.

FIG. 22 is a reference view for explaining a leading picture according to an exemplary embodiment.

The leading picture is a picture that is decoded after an RAP picture in a decoding order but is output prior to the RAP picture in an output order. A picture that is decoded and output after an RAP picture in the decoding order and the output order is defined as a normal picture or a trailing picture.

Referring to FIG. 22, B0 through B6 pictures 2210 are leading pictures that are decoded after an RAP picture 2201 in a decoding order but precede the RAP picture 2201 in an output order. In FIG. 22, an arrow direction is assumed as a reference direction. For example, a B6 picture 2203 uses a B5 picture 2202 and an RAP picture 2201 as reference pictures. When random access starts from the RAP picture 2201, leading pictures are classified as a random access decodable leading (RADL) picture and a random access skipped leading (RASL) picture according to whether decoding is possible. In FIG. 22, since B0 through B2 pictures 2220 may be predicted based on a P picture 2204 that is received and decoded prior to the RAP picture 2201, so when the random access starts from the RAP picture 2201, the B0 through B2 pictures 2220 are pictures that may not be normally decoded. Like the B0 through B2 pictures 2220, when the random access starts from the RAP picture 2201, a leading picture that may not be normally decoded is defined as an RASL picture. Meanwhile, since B3 through B6 pictures 2230 use only pictures decoded after the RAP picture 2201 as reference pictures, even when the random access starts from the RAP picture 2201, the B3 through B6 pictures 2230 are pictures that may not be normally decoded. Like the B3 through B6 pictures 2230, when the random access starts from the RAP picture 2201, a picture that may not be normally decoded is defined as an RADL picture.

Figure 23:
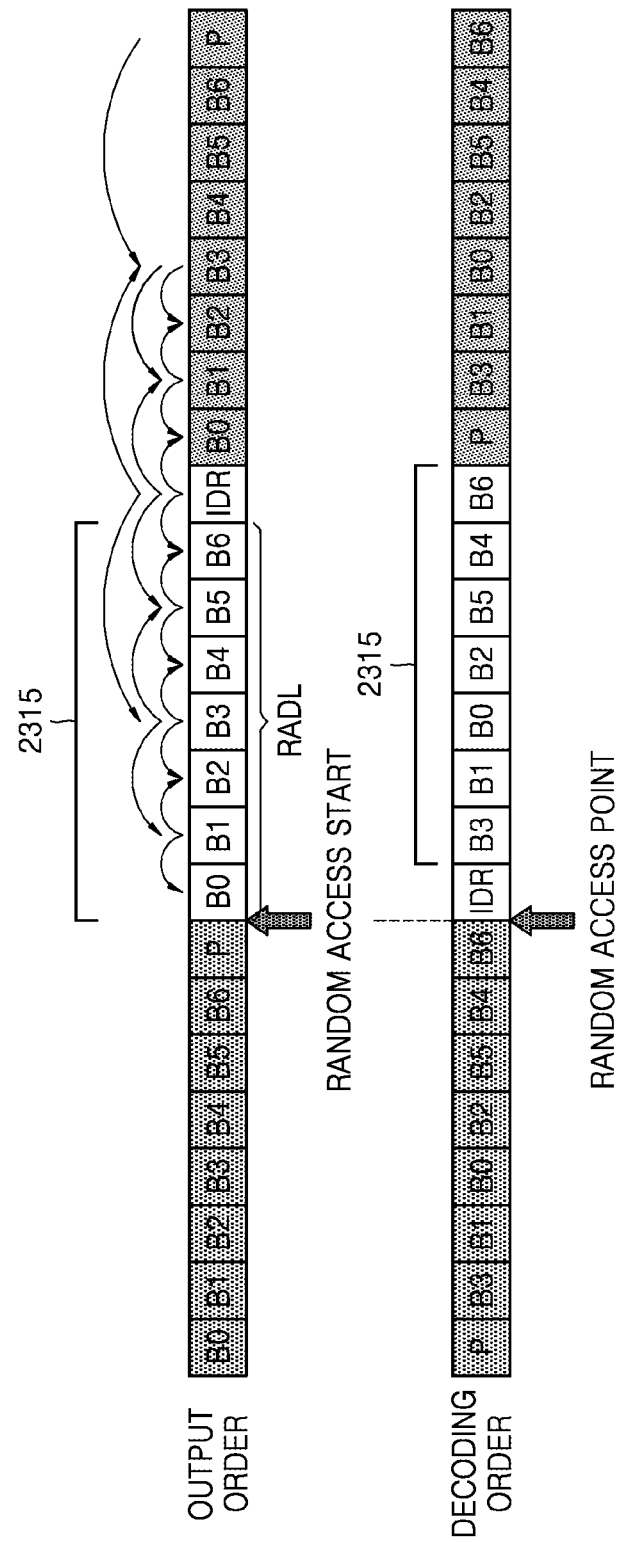
FIGS. 23 and 24 are reference views for explaining an IDR picture.
Figure 24:
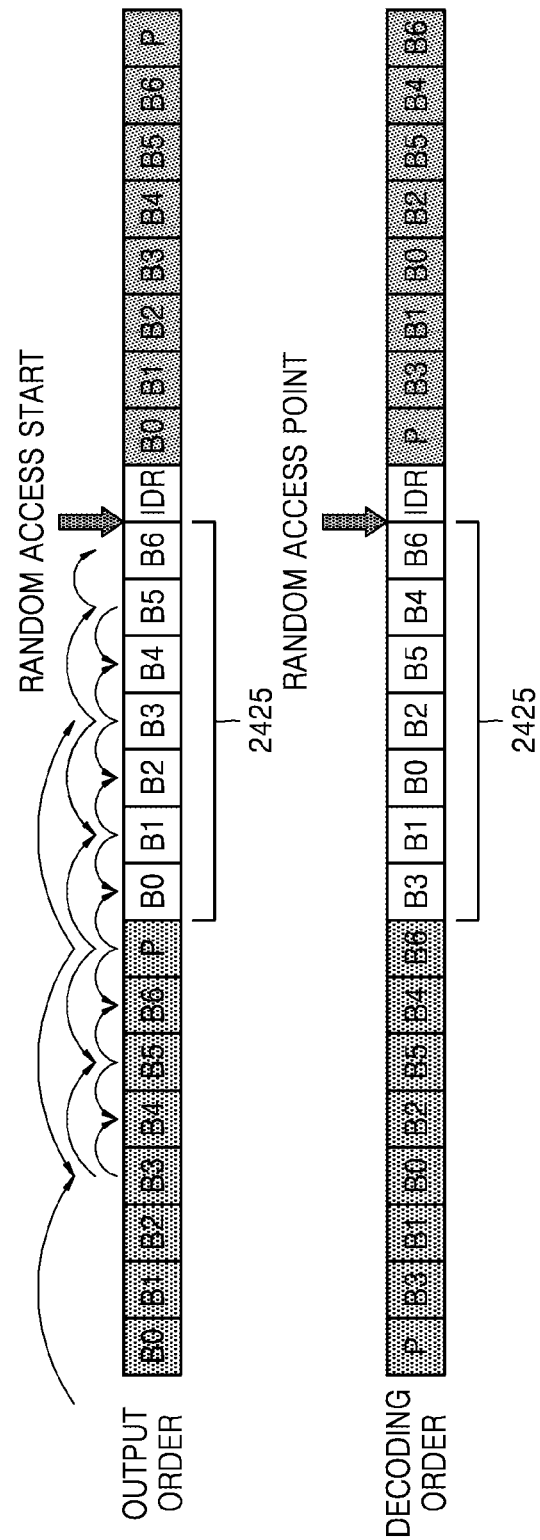

FIGS. 23 and 24 are reference views for explaining an IDR picture.

As described above, the IDR picture initializes a decoded picture buffer (DPB) and a POC at the instant that the IDR picture is decoded, and a picture decoded after the IDR picture is always behind the IDR picture in an output order and is decoded without referring to a picture prior to the IDR picture. However, the IDR picture follows a closed GOP structure in which leading pictures are limited to use a picture decoded prior to the IDR picture as a reference picture. Thus, the IDR picture may be classified as two types of IDR pictures based on whether a leading picture exists and whether an RADL picture exists. In more detail, IDR pictures may be classified as two types of i) an IDR picture IDR_N_LP having no leading picture and ii) an IDR picture IDR_W_LP having an RADL picture that is a decodable leading picture.

FIG. 23 shows the IDR picture IDR_W_LP having the RADL picture that is the decodable leading picture, according to an exemplary embodiment. Referring to FIG. 23, B0 through B6 pictures 2315 are leading pictures that are prior to the IDR picture in an output order but are decoded after the IDR picture in a decoding order. Since pictures decoded after the IDR picture do not use a picture decoded prior to the IDR picture as a reference picture, all leading pictures of the IDR picture correspond to RADL pictures decodable at a random access time.

FIG. 24 shows the IDR picture IDR_N_LP having no leading picture, according to an exemplary embodiment. Referring to FIG. 24, unlike FIG. 23 described above, B0 through B6 pictures 2425 refer to only a picture decoded prior to the IDR picture, and the IDR picture has no leading picture. As described above, IDR pictures may be classified as two types of i) the IDR picture IDR_N_LP having no leading picture and ii) the IDR picture IDR_W_LP having an RADL picture that is a decodable leading picture.

A CRA picture, which is an I picture, initializes a DPB at the instant that the CRA picture is decoded similar to the IDR picture. Normal pictures that follow a CRA picture in both a decoding order and an output order may not refer to a picture prior to the CRA picture. However, the IDR picture follows a closed GOP structure in which leading pictures are limited to using a picture decoded prior to the IDR picture as a reference picture, whereas the CRA picture allows a leading picture to use a picture decoded prior to the CRA picture as a reference picture. That is, in the CRA picture, a picture referring to a picture decoded prior to the CRA picture may exist among leading pictures that are pictures following the CRA picture in the decoding order but preceding the CRA picture in an output order. When random access starts from the CRA picture, since some leading pictures use a reference picture that may not be used at a random access point, the leading pictures may not be decoded.

Thus, CRA pictures may be classified as i) a CRA picture CRA_N_LP having no leading picture, ii) a CRA picture CRA_W_RADL having a RADL picture, and iii) a CRA picture CRA_W_RASL having an RASL picture. The reason why CRA pictures are classified as described above is that when the CRA picture has an RASL picture, the RASL picture may be discarded without being decoded during the random access. A decoding apparatus may previously determine whether an RASL picture of which decoding is not necessary at a decoding time exists, and, when receiving an NAL unit bitstream including the RASL picture, may skip an unnecessary decoding process on a corresponding RASL picture.

Figure 25:
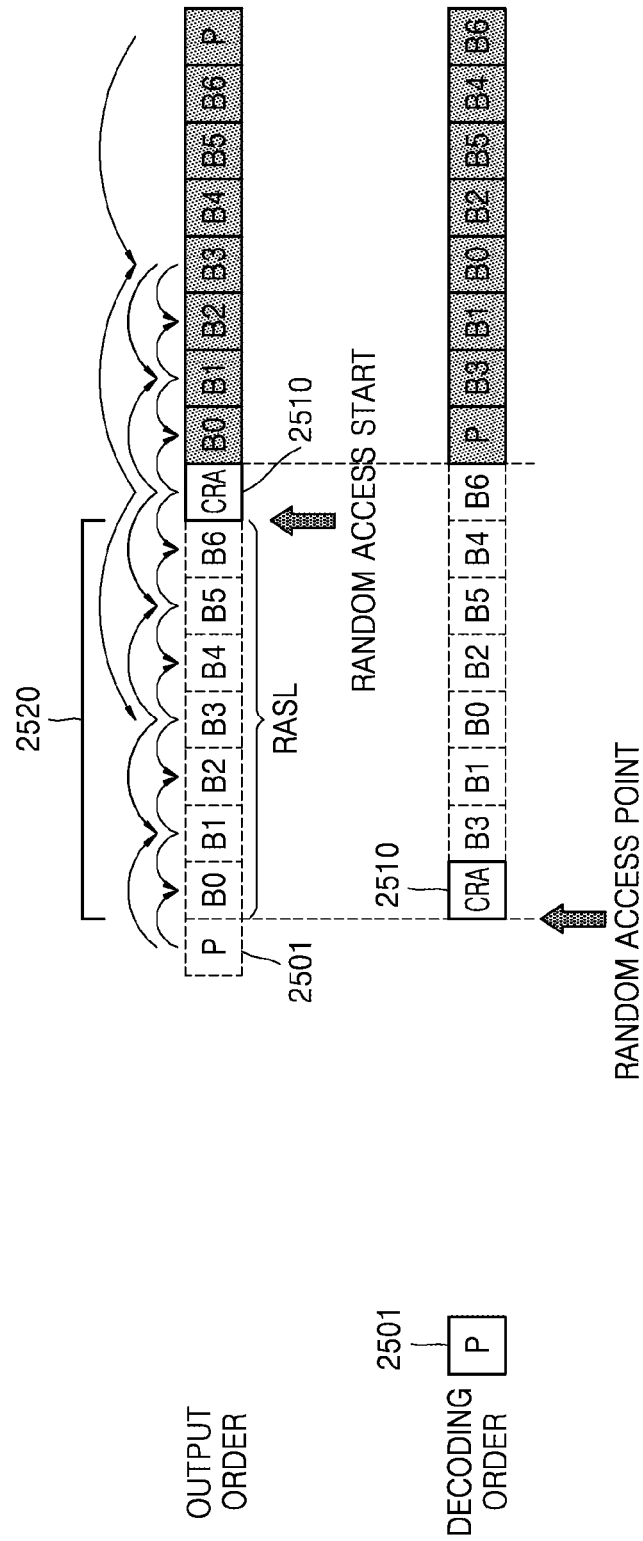
FIG. 25 shows a CRA picture CRA_W_RASL having an RASL picture.

FIG. 25 shows a CRA picture CRA_W_RASL having an RASL picture, according to an exemplary embodiment.

Referring to FIG. 25, since random access starts from a CRA picture 2010, a P picture 2501 that precedes the CRA picture 2510 in a decoding order is not decoded. Thus, pictures that use the P picture 2501 as a reference picture or pictures that use, as a reference picture, a picture that uses the P picture 2501 as the reference picture, for example, B0 through B6 pictures 2520, are RASL pictures that are not decodable during the random access.

When not limited to an example of FIG. 25, and some leading pictures of a CRA picture are RASL pictures, the CRA picture is the CRA picture CRA_W_RASL having the RASL picture. Similarly to the IDR picture IDR_W_RADL having the RASL picture of FIG. 23 described above, when leading pictures of the CRA picture are RADL pictures, the CRA picture is a CRA picture CRA_W_RADL having a leading picture. Similarly to the IDR picture IDR_N_LP having a leading picture of FIG. 24 described above, when no leading picture of the CRA picture exists, the CRA picture is a CRA picture CRA_N_LP having no leading picture.

Meanwhile, a point where different bitstreams are connected by bitstream slicing is referred to as a broken link. A picture of a point in which a new bitstream starts by such bitstream slicing is defined as a BLA picture that is the same as the CRA picture except that the BLA picture is generated by performing a slicing operation. The CRA picture may be changed to the BLA picture by performing the slicing operation.

The BLA picture, which is also an I picture, initializes a DPB at the instant that the BLA picture is decoded similar to the IDR picture. Normal pictures that follow the BLA picture both in a decoding order and an output order may not refer to a picture prior to the BLA picture. However, the BLA picture allows a leading picture to use a picture decoded prior to the BLA picture as a reference picture. That is, in the BLA picture, a picture referring to a picture decoded prior to the BLA picture may exist among leading pictures that are pictures following the BLA picture in the decoding order but preceding the BLA picture in an output order. When random access starts from the BLA picture, since some leading pictures use a reference picture that may not be used at a random access point, they may not be decoded.

Thus, BLA pictures may be classified as i) the BLA picture BLA_N_LP having no leading picture, ii) the BLA picture BLA_W_RADL having a RADL picture, and iii) the BLA picture BLA_W_RASL having an RASL picture. The reason why BLA pictures are classified as described above is that when the BLA picture has an RASL picture, the RASL picture may be discarded without being decoded during the random access. A decoding apparatus may previously determine whether an RASL picture of which decoding is not necessary at a decoding time exists, and, when receiving an NAL unit bitstream including the RASL picture, may skip an unnecessary decoding process on a corresponding RASL picture.

Figure 26:
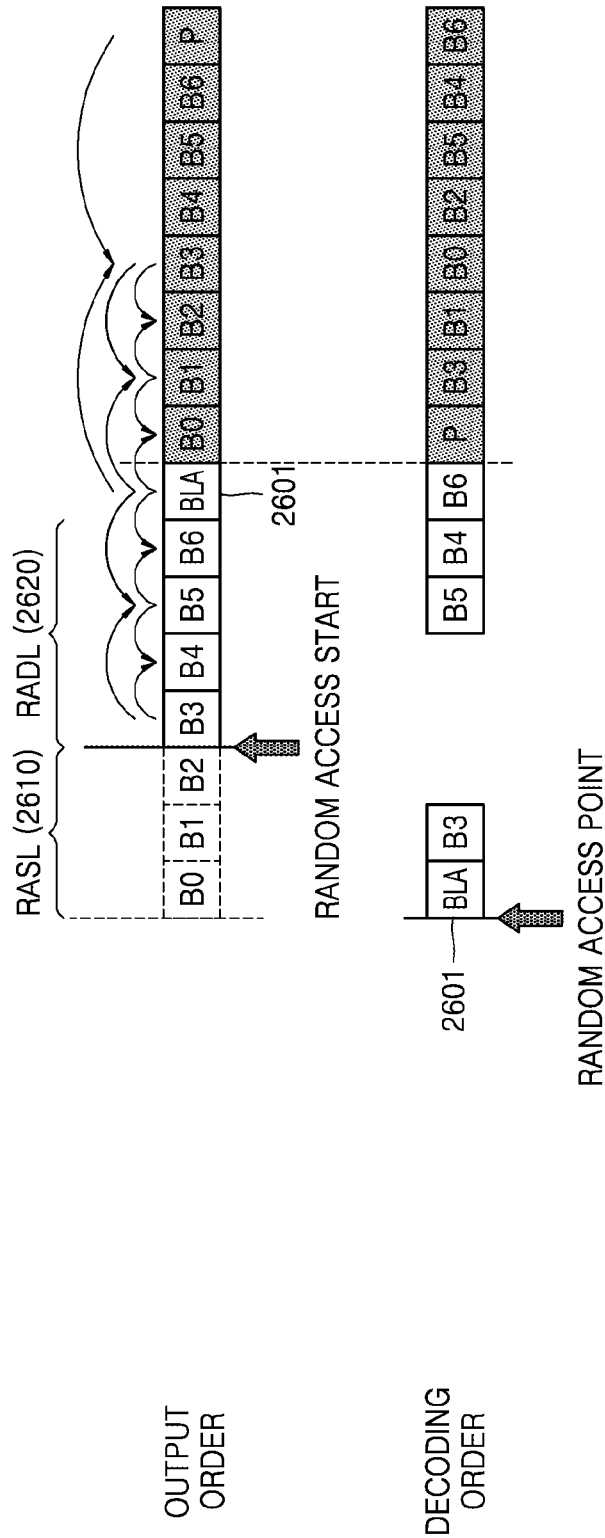
FIG. 26 shows an example of an RASL picture and an RADL picture with respect to a BLA picture.

FIG. 26 shows an example of an RASL picture and an RADL picture with respect to a BLA picture, according to an exemplary embodiment. In FIG. 26, it is assumed that B0 through B2 pictures 2610 are pictures that refer to a picture preceding a BLA picture 2601 in a decoding order, and B3 through B6 pictures 2601 are also pictures that refer to the BLA picture 2601 or a picture decoded after the BLA picture 2601. Since random access starts by decoding the BLA picture 2601, the picture referred to by the B0 through B2 pictures 2610 may not be used. Thus, the B0 through B2 pictures 2610 correspond to RASL pictures that are not decodable. B3 through B6 pictures 2620 use only a picture decoded after the BLA picture 2601 as a reference picture, and thus they correspond to RADL pictures that are decodable during a random access. The video encoding apparatus 1400 classifies a corresponding BLA picture as the BLA picture BLA_W_RASL having the RASL picture when the RASL picture exists among leading pictures of the BLA picture.

Similarly to the IDR picture IDR_W_RADL having the RASL picture of FIG. 23 described above, when leading pictures of the BLA picture are RADL pictures, the BLA picture is the BLA picture BLA_W_RADL having a leading picture. Similarly to the IDR picture IDR_N_LP having a leading picture of FIG. 24 described above, when no leading picture of the BLA picture exists, the BLA picture is the BLA picture BLA_N_LP having no leading picture.

Figure 29:
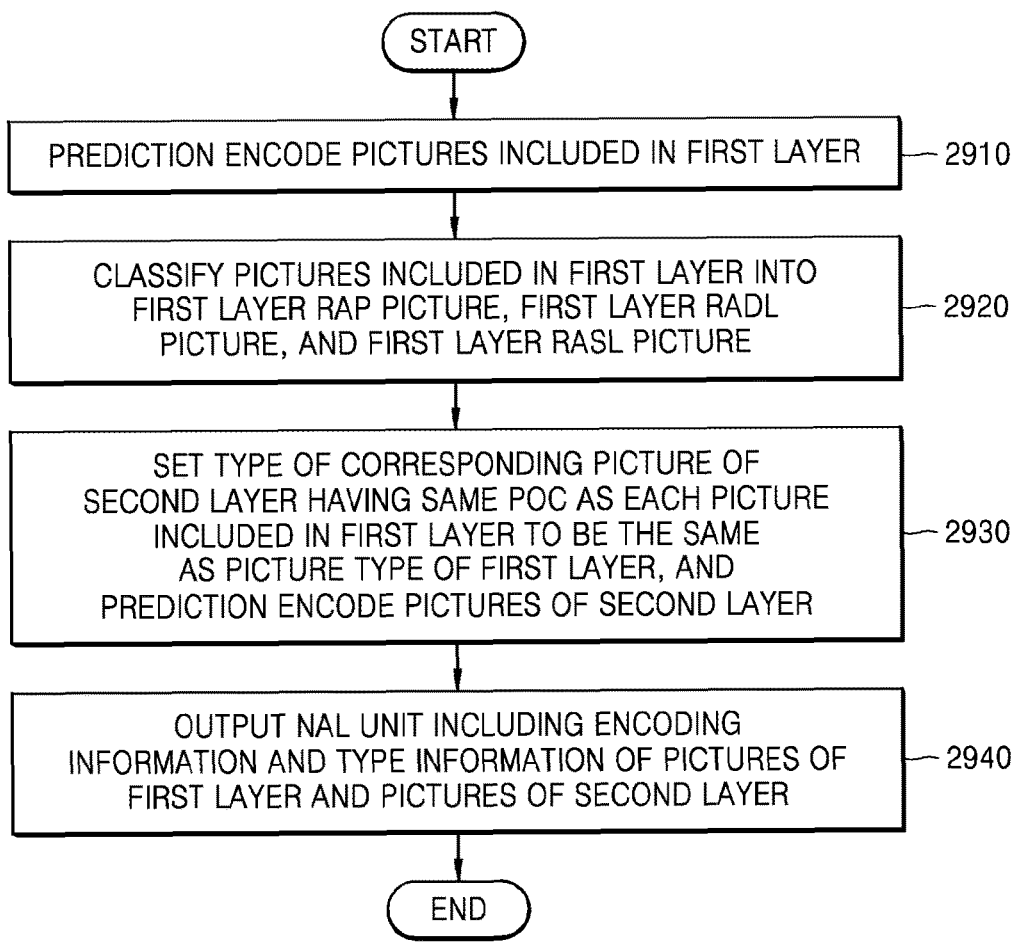
FIG. 29 is a flowchart of a multi-layer video encoding method according to an exemplary embodiment.

FIG. 29 is a flowchart of a multi-layer video encoding method according to an exemplary embodiment.

Referring to FIGS. 14 and 29, in operation 2910, the video encoder 1410 predicts and encodes pictures included in the first layer. The video encoder 1410 may perform encoding by transforming and quantizing a difference between a prediction value generated by inter prediction, intra prediction, and interlayer prediction and an original signal. According to the encoding process in a VCL, the video encoder 1410 outputs residual information related to a coding unit, prediction mode information, and additional information related to prediction encoding of the coding unit.

In operation 2920, the output unit 1420 classifies pictures included in the first layer into a first layer RAP picture, a first layer RADL picture, and a first layer RASL picture based on an output order and a reference relationship of the pictures included in the first layer. The first layer RAP may be classified again into an IDR picture, a CRA picture, and a BLA picture.

In operation 2930, the video encoder 1410 sets a type of a corresponding picture of a second layer having a same POC as each picture included in the first layer, to be the same as the picture type of the first layer, and prediction encodes the pictures of the second layer.

In operation 2940, the output unit 1420 outputs a NAL unit including encoding information and type information of the pictures of the first layer and the pictures of the second layer. A type of pictures included in each NAL unit may be signaled based on an identifier of a NAL header (nal unit type). A VLA picture of the second layer defined according to another exemplary embodiment may also be included in a NAL unit having a preset identifier value (nal unit type) and transmitted.

Figure 30:
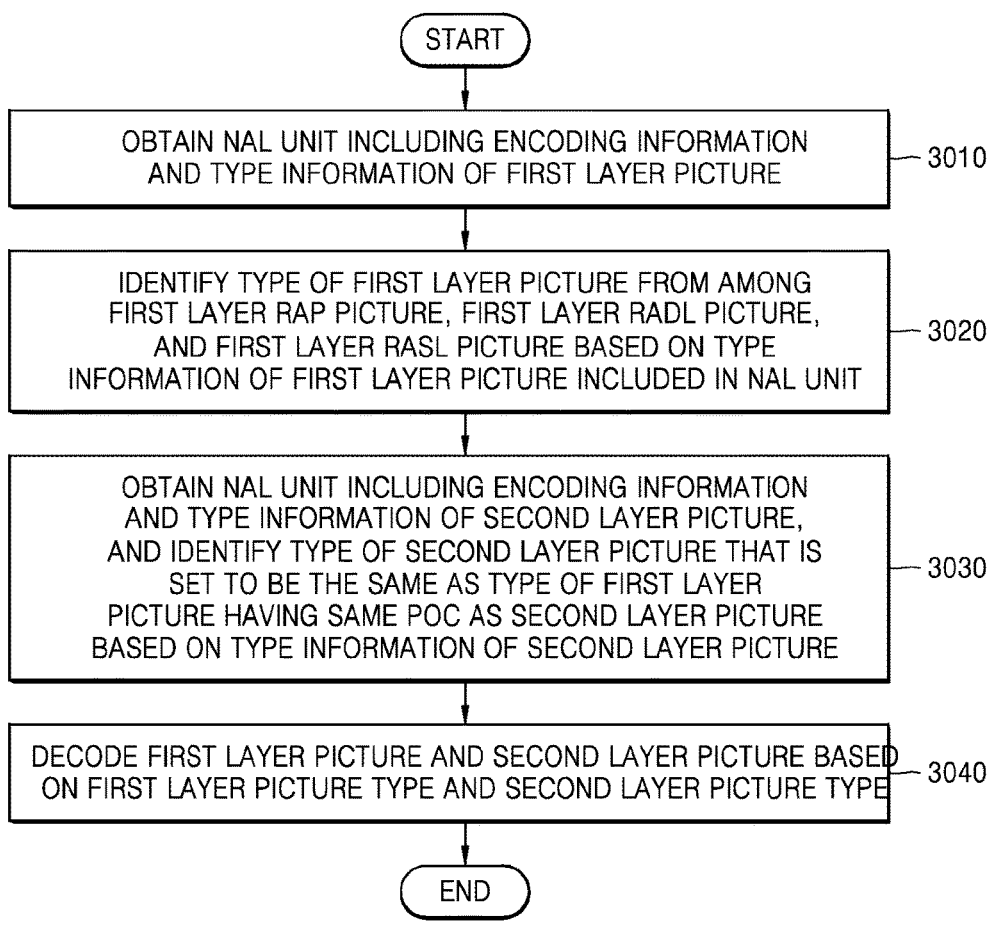
FIG. 30 is a flowchart of a multi-layer video encoding method according to an exemplary embodiment.

FIG. 30 is a flowchart of a multi-layer video encoding method according to an exemplary embodiment.

Referring to FIGS. 15 and 30, in operation 3010, the receiver 1510 obtains a NAL unit including encoding information and type information of a first layer picture.

In operation 3020, the video decoder 1520 identifies a type of the first layer picture from among a first layer RAP picture, a first layer RADL picture, and a first layer RASL picture based on the type information of the first layer picture included in the NAL unit. The video decoder 1520 may identify encoding information and a picture type included in a current NAL unit based on an identifier value (nal unit type) included in a header of the NAL unit. A VLA picture of the second layer defined according to another exemplary embodiment may also be included in the NAL unit having a preset identifier value (nal unit type) and transmitted.

In operation 3030, the receiver 1510 may obtain the NAL unit including encoding information and type information of the second layer picture, and the video decoder 1520 identifies a type of the second layer picture that is set to be the same as the type of the first layer picture having the same POC as the second layer picture based on the type information of the second layer picture included in the NAL unit.

In operation 3040, the video decoder 1520 decodes the first layer picture and the second layer picture based on the identified first layer picture type and the identified second layer picture type. The video decoder 1520 may independently decode encoded data of each layer or may use information about a previously layer that is previously decoded, as reference information when decoding other layers. The video decoder 1520 reconstructs a residual by performing entropy decoding, inverse quantization, inverse transformation on pictures of the encoded multi-layer, generates a prediction signal by applying at least one prediction method among intra prediction, interprediction, and interlayer prediction, and performs decoding by adding the reconstructed residual and the prediction signal. The video decoder 1520 may decode a VLA picture of the second layer by referring to a picture of previously decoded other layers.

One or more exemplary embodiments can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion. Moreover, it is understood that in exemplary embodiments, one or more units or components of the above-described apparatuses can include circuitry, a processor, a microprocessor, etc., and may execute a computer program stored in a computer-readable medium.

While exemplary embodiments have been particularly shown and described above, it will be understood by those of ordinary skill in the art that various changes in form and details may be made therein without departing from the spirit and scope of the inventive concept as defined by the appended claims. Exemplary embodiments should be considered in a descriptive sense only and not for purposes of limitation. Therefore, the scope of the inventive concept is defined not by the detailed description of exemplary embodiments, but by the appended claims, and all differences within the scope will be construed as being included in the inventive concept.

The invention claimed is:

1. A multi-layer video decoding method comprising:
obtaining a network adaptive layer (NAL) unit including encoding information and type information of a first layer picture;
identifying, based on type information of the first layer picture included in the NAL unit, a type of the first layer picture from among
a first layer random access point (RAP) picture that is randomly accessible,
a first layer random access decodable leading (RADL) picture which is among leading pictures that are encoded after the first layer RAP picture but precede the first layer RAP picture in an output order and are decodable to the first layer RAP picture during random access based on whether a picture decoded prior to the first layer RAP picture is referred to, and
a first layer random access skipped leading (RASL) picture that is not decodable;
obtaining a NAL unit including encoding information and type information of a second layer picture, and identifying, based on the type information of the second layer picture included in the NAL unit, a type of the second layer picture that is set to be the same as the type of the first layer picture having a same picture order count (POC) as the second layer picture; and
decoding the first layer picture and the second layer picture based on the identified first layer picture type and the identified second layer picture type,
wherein the first layer RAP picture is one of an instantaneous decoding refresh (IDR) picture, a clean random access (CRA) picture, and a broken link access (BLA) picture that are classified based on whether pictures following the first layer RAP picture in a decoding order and an output order are able to refer to a picture preceding the first layer RAP picture in a decoding order and whether the first layer RAP picture is generated by splicing,
wherein the IDR picture is a picture, regarding which pictures following the IDR picture in a decoding order do not refer to other pictures preceding the IDR picture in a decoding order, and
the CRA picture is a picture, regarding which pictures following the CRA picture in a decoding order and an output order do not refer to other pictures preceding the CRA picture in one of a decoding order or an output order, and a picture preceding the CRA picture always precedes the CRA picture in an output order, and
the BLA picture refers to a first picture of different video sequences that are combined by splicing.

2. The multi-layer decoding method of claim 1, wherein the first layer RAP picture and the second layer RAP picture are classified based on whether the RADL picture or the RASL picture exists.

3. The multi-layer video decoding method of claim 1, wherein the decoding comprises, when random access to a second layer RAP picture is generated among pictures of the second layer, skipping a decoding process on pictures identified as leading pictures of the second layer RAP picture.

4. The multi-layer decoding method of claim 1, wherein:
the identifying of the type of the second layer picture comprises identifying, based on the type information included in the NAL unit, a second layer view layer access (VLA) picture that is a second layer RAP picture interlayer predicted by referring to other layers than the second layer;
pictures following the second layer RAP picture in a decoding order and an output order do not refer to other pictures preceding the second layer RAP picture in one of the decoding order and the output order, and a picture preceding the second layer RAP picture in the decoding order always precedes the second layer RAP picture in the output order; and the decoding comprises, when random access to the second layer VLA picture is generated, skipping decoding on a RADL picture and RASL pictures referring to a picture that is decoded prior to the second layer VLA picture and precedes the second layer VLA picture in an output order.

5. A multi-layer video encoding method comprising:

prediction encoding pictures included in a first layer;

classifying pictures included in a first layer, based on an output order and a reference relationship of the pictures included in the first layer, into
- a first layer random access point (RAP) picture that is randomly accessible,
- a first layer random access decodable leading (RADL) picture which is among leading pictures that are encoded after the first layer RAP picture but precede the first layer RAP picture in an output order and are reconstructable to the first layer RAP picture during random access based on whether a picture encoded prior to the first layer RAP picture is referred to, and
- a first layer random access skipped leading (RASL) picture that is not reconstructable;

setting a type of a corresponding picture of a second layer having a same picture order count (POC) as each picture included in the first layer to be the same as the classified picture type of the first layer and prediction encoding pictures of the second layer; and outputting a NAL unit including encoding information and type information of the pictures of the first layer and the pictures of the second layer, wherein the classifying comprises classifying the first layer RAP picture into an instantaneous decoding refresh (IDR) picture, a clean random access (CRA) picture, or a broken link access (BLA) picture based on whether pictures following the first layer RAP picture in an encoding order and an output order are able to refer to a picture preceding the first layer RAP picture in an encoding order and based on whether the first layer RAP picture is generated by splicing, wherein the IDR picture is a picture, regarding which pictures following the IDR picture in an encoding order do not refer to other pictures preceding the IDR picture in a decoding order, and
- the CRA picture is a picture, regarding which pictures following the CRA picture in a decoding order and an output order do not refer to other pictures preceding the CRA picture in one of a decoding order or an output order, and a picture preceding the CRA picture always precedes the CRA picture in an output order, and
- the BLA picture refers to a first picture of different video sequences that are combined by splicing.

6. The multi-layer encoding method of claim 5, further comprising classifying the first layer RAP picture based on whether the RADL picture or the RASL picture exists.

7. The multi-layer encoding method of claim 5, further comprising:

classifying, as a second layer view layer access (VLA) picture, a second layer RAP picture interlayer predicted by referring to other layers than the second layer, wherein pictures following the second layer RAP picture in an encoding order and an output order do not refer to other pictures preceding the second layer RAP picture in one of the encoding order and the output order, and a picture preceding the second layer RAP picture in the encoding order always precedes the second layer RAP picture in the output order, and wherein, when random access to the second layer VLA picture is generated in a decoder, decoding on a RADL picture and a RASL picture referring to a picture that is decoded prior to the second layer VLA picture and preceding the second layer VLA picture in an output order is skipped.

8. A multi-layer video decoding apparatus comprising:

a receiver configured to obtain a network adaptive layer (NAL) unit including encoding information and type information of a first layer picture and a NAL unit including encoding information and type information of a second layer picture; and an image decoder configured to identify, based on type information of the first layer picture included in the NAL unit, a type of the first layer picture from among
- a first layer random access point (RAP) picture that is randomly accessible,
- a first layer random access decodable leading (RADL) picture which is among leading pictures that are encoded after the first layer RAP picture but precede the first layer RAP picture in an output order and are decodable to the first layer RAP picture during random access based on whether a picture decoded prior to the first layer RAP picture is referred to, and
- a first layer random access skipped leading (RASL) picture that is not decodable, wherein the decoder is further configured to identify a type of the second layer picture that is set to be the same as a type of the first layer picture having a same POC as the second layer picture based on the type information of the second layer picture included in the NAL unit, and to decode the first layer picture and the second layer picture based on the identified first layer picture type and the identified second layer picture type, wherein the image decoder is configured to identify, based on the type information included in the NAL unit, a second layer view layer access (VLA) picture that is a second layer RAP picture interlayer predicted by referring to other layers than the second layer, wherein pictures following the second layer RAP picture in a decoding order and an output order do not refer to other pictures preceding the second layer RAP picture in one of a decoding order or an output order, and a picture preceding the second layer RAP picture in a decoding order always precedes the second layer RAP picture in an output order, and when random access to the second layer VLA picture is generated, to skip decoding on a RADL picture and a RASL picture referring to a picture that is decoded prior to the second layer VLA picture and preceding the second layer VLA picture in an output order.

9. A multi-layer video encoding apparatus comprising:

a video encoder configured to prediction encode pictures included in a first layer and a second layer; and an output unit configured to classify pictures included in the first layer, based on an output order and a reference relationship of the pictures included in the first layer, into
- a first layer random access point (RAP) picture that is randomly accessible,
- a first layer random access decodable leading (RADL) picture which is among leading pictures that are encoded after the first layer RAP picture but precede the first layer RAP picture in an output order and are reconstructable to the first layer RAP picture during random access based on whether a picture encoded prior to the first layer RAP picture is referred to, and a first layer random access skipped leading (RASL) picture that is not reconstructable, set a type of a corresponding picture of the second layer having a same POC as each picture included in the first layer to be the same as the classified picture type of the first layer, and output a NAL unit including encoding information and type information of the pictures of the first layer and pictures of the second layer, wherein the output unit is configured to classify, as a second layer view layer access (VLA) picture, a second layer RAP picture interlayer predicted by referring to other layers than the second layer, from among pictures included in the second layer, wherein pictures following the second layer RAP picture in an encoding order and an output order do not refer to other pictures preceding the second layer RAP picture in one of an encoding order or an output order, and a picture preceding the second layer RAP picture in an encoding order always precedes the second layer RAP picture in an output order, wherein, when random access to the second layer VLA picture is generated, decoding on a RADL picture and a RASL picture referring to a picture that is decoded prior to the second layer VLA picture and preceding the second layer VLA picture in an output order is skipped.

* * * * *